(12) United States Patent
Erdman et al.

(10) Patent No.: US 8,035,240 B2
(45) Date of Patent: Oct. 11, 2011

(54) SYSTEMS AND METHODS FOR SYNCHRONOUS SPEED AVOIDANCE IN DOUBLY-FED INDUCTION GENERATORS

(75) Inventors: William L. Erdman, Moraga, CA (US); Michael R. Behnke, Livermore, CA (US); Steve Tonks, Sarriguren (ES); Miguel Núñez Polo, Sarriguren (ES)

(73) Assignee: Acciona Windpower, S.A., Sarriguren (Navarra) (ES)

( * ) Notice: Subject to any disclaimer, the term of this patent is extended or adjusted under 35 U.S.C. 154(b) by 703 days.

(21) Appl. No.: 12/129,543

(22) Filed: May 29, 2008

(65) Prior Publication Data

US 2009/0008938 A1    Jan. 8, 2009

Related U.S. Application Data

(60) Provisional application No. 60/932,593, filed on May 30, 2007.

(51) Int. Cl.
*F03D 9/00* (2006.01)
*H02P 9/04* (2006.01)

(52) U.S. Cl. ............................. 290/44; 290/55
(58) Field of Classification Search ............... 290/44, 290/55
See application file for complete search history.

(56) References Cited

U.S. PATENT DOCUMENTS

| | | | |
|---|---|---|---|
| 3,183,431 A * | 5/1965 | Ford ............................... | 322/32 |
| 4,625,160 A | 11/1986 | Hucker ........................... | 322/32 |
| 4,695,736 A | 9/1987 | Doman et al. ................... | 290/44 |
| 4,994,684 A | 2/1991 | Lauw et al. ..................... | 290/52 |
| 6,749,393 B2 | 6/2004 | Sosonkina ....................... | 415/4.1 |
| 7,176,804 B2 | 2/2007 | Norrena et al. ................. | 340/588 |
| 2005/0012339 A1 | 1/2005 | Mikhail et al. .................. | 290/44 |
| 2007/0018457 A1 | 1/2007 | Llorente .......................... | 290/44 |
| 2008/0030027 A1* | 2/2008 | Erdman et al. .............. | 290/40 R |
| 2009/0008937 A1* | 1/2009 | Erdman et al. .................. | 290/44 |

OTHER PUBLICATIONS

International Search Report and Written Opinion, mailed Sep. 4, 2008.
Hidalgo, "Characterisation of 3.3kV IGCTs for Medium Power Applications," Nov. 3, 2005, retrieved from <URL: http://ethesis.inp-toulouse.fr/archive/00000281/01/alvarez1.pdf>.
Patel, "Wind and Solar Power Systems," 1999, retrieved on Aug. 23, 2008 from <URL:http://ebooks.ulb.tu-darmstadt.de/1146/>.

* cited by examiner

*Primary Examiner* — Pedro J Cuevas
(74) *Attorney, Agent, or Firm* — Chadbourne & Parke, LLP; Walter G. Hanchuk

(57) ABSTRACT

The disclosure details implementations of apparatuses, methods, and systems for facilitating efficient operational characteristics for wind turbine generators. The system includes features that facilitate protecting the power semiconductors used in the power converters of variable speed power generation systems from excessive junction temperatures. These features may be achieved by implementing a synchronous speed avoidance (SSA) controller implemented to facilitate a determined active control range as an electrical torque/power-generator rotor speed controller. The determined active control range may be centered around a generator synchronous speed. The upper and lower bounds of the active control range are determined based on operational junction temperature characteristics of power semiconductors used within a power converter, reliability characteristics of the power semiconductors and/or current ratings of the power semiconductors.

50 Claims, 16 Drawing Sheets

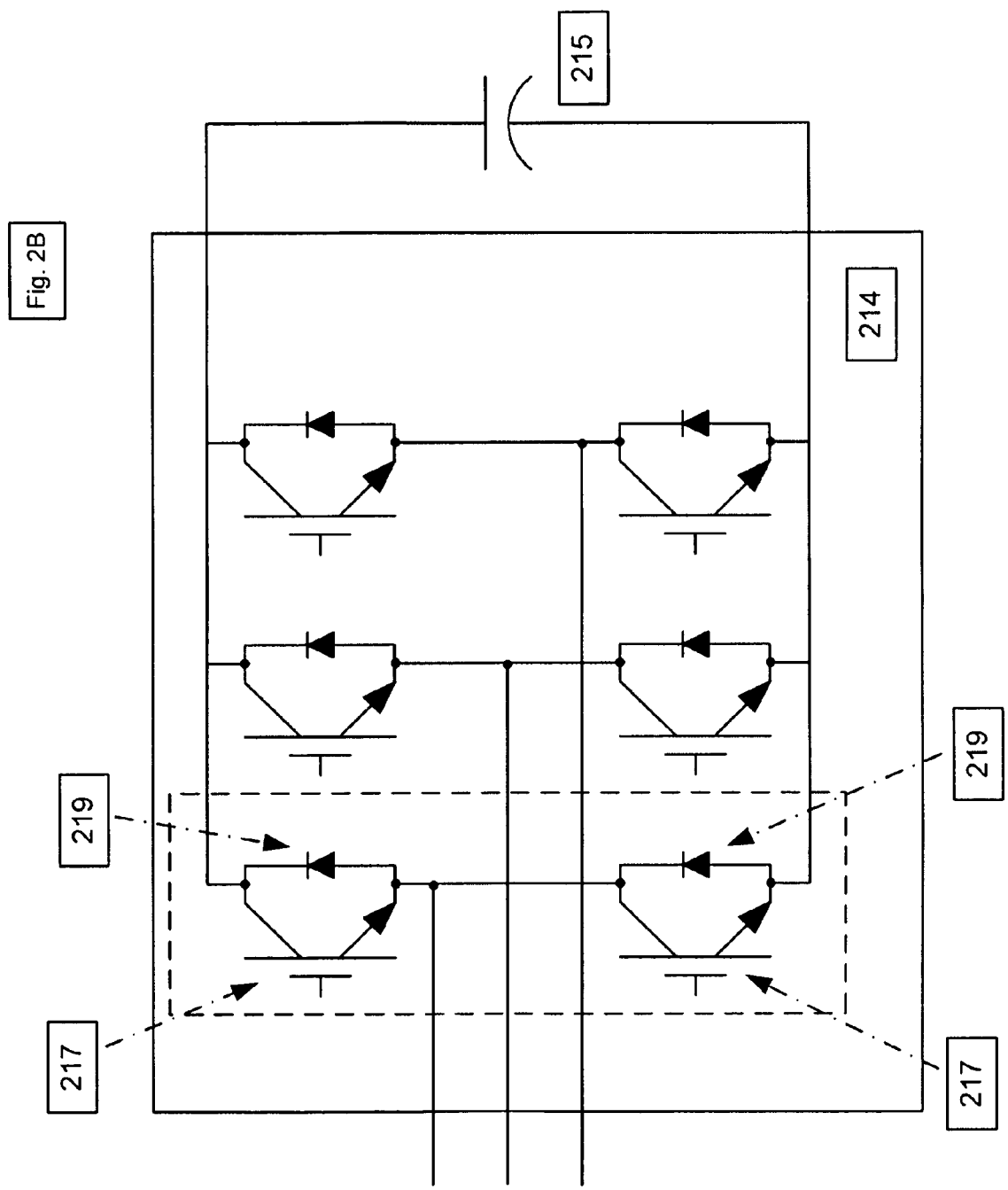

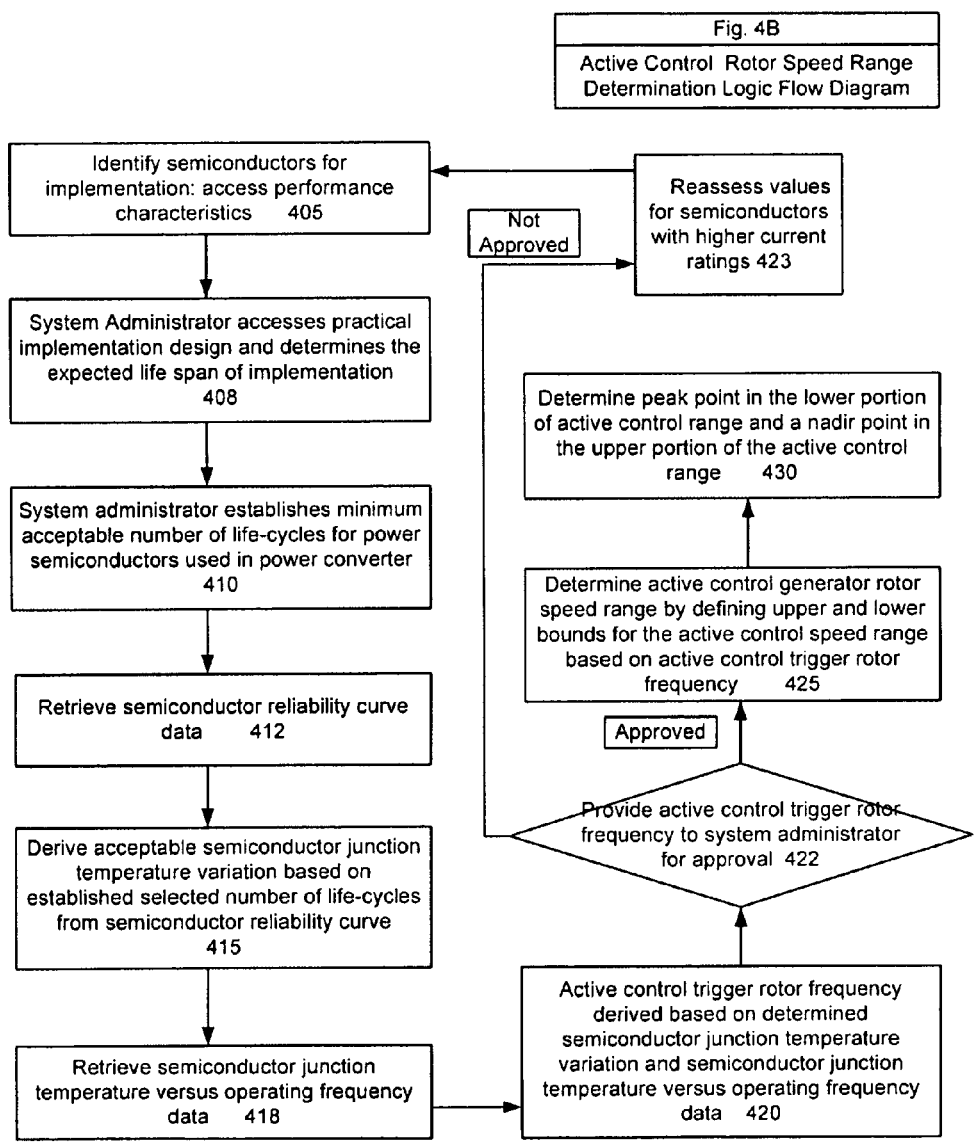

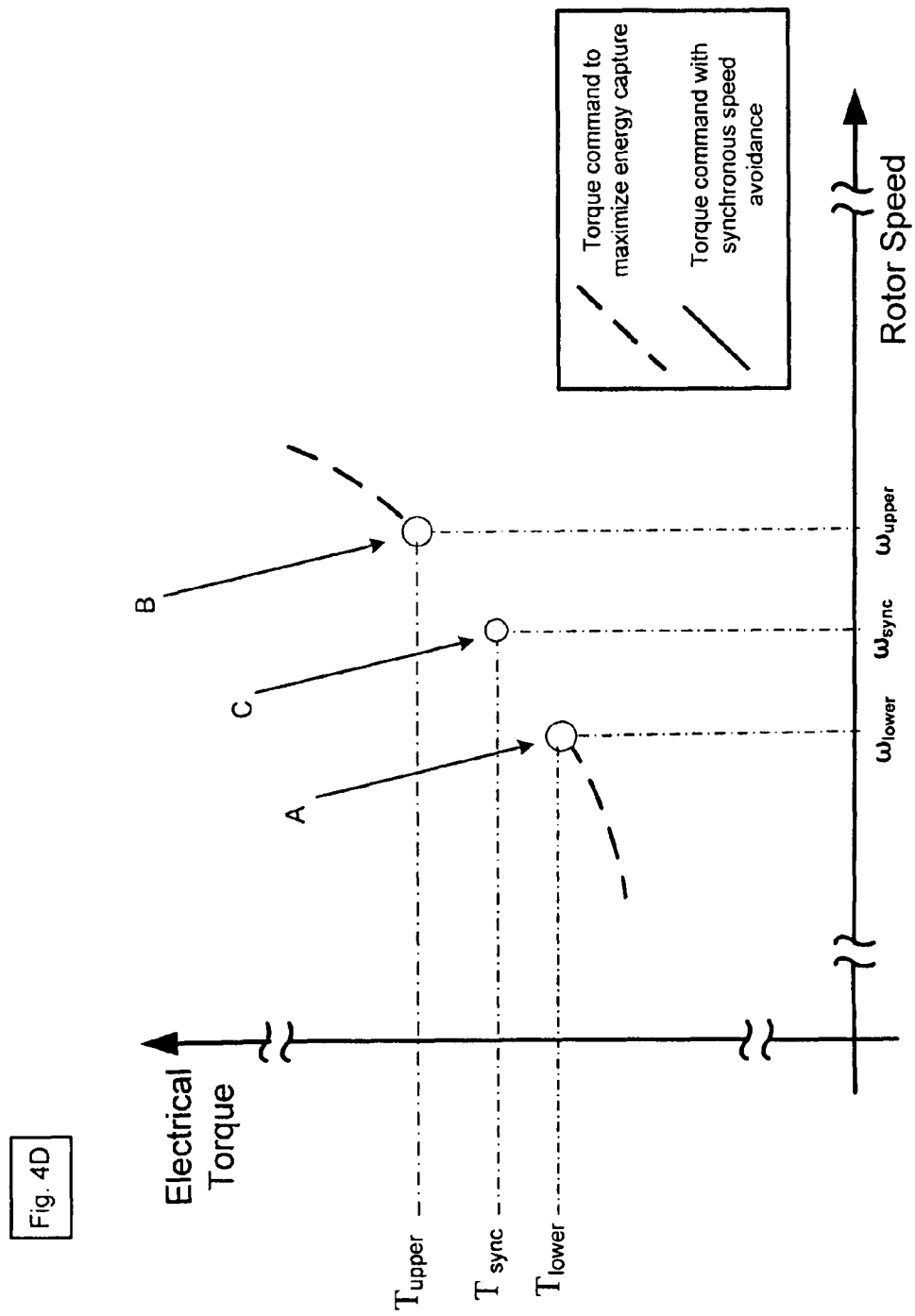

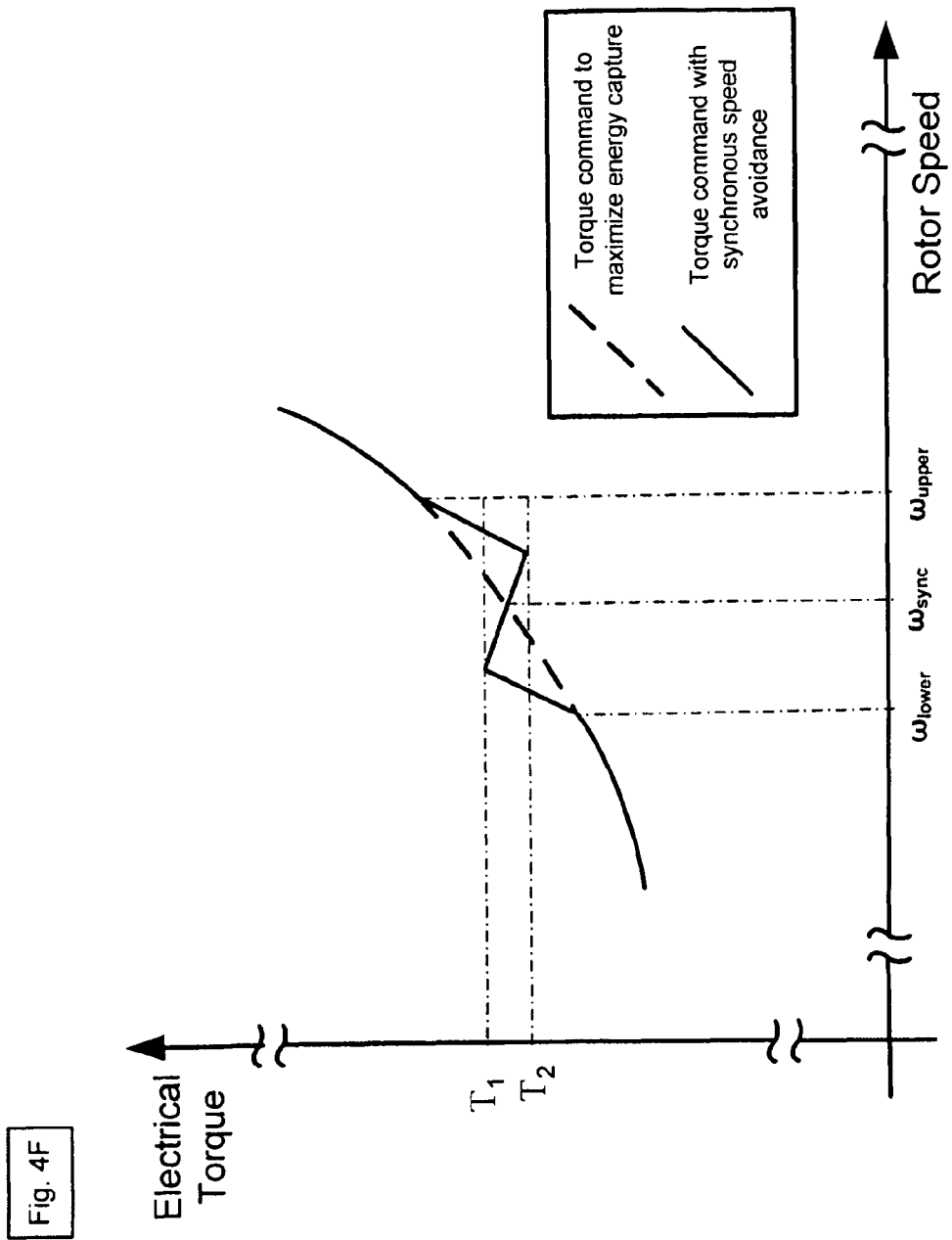

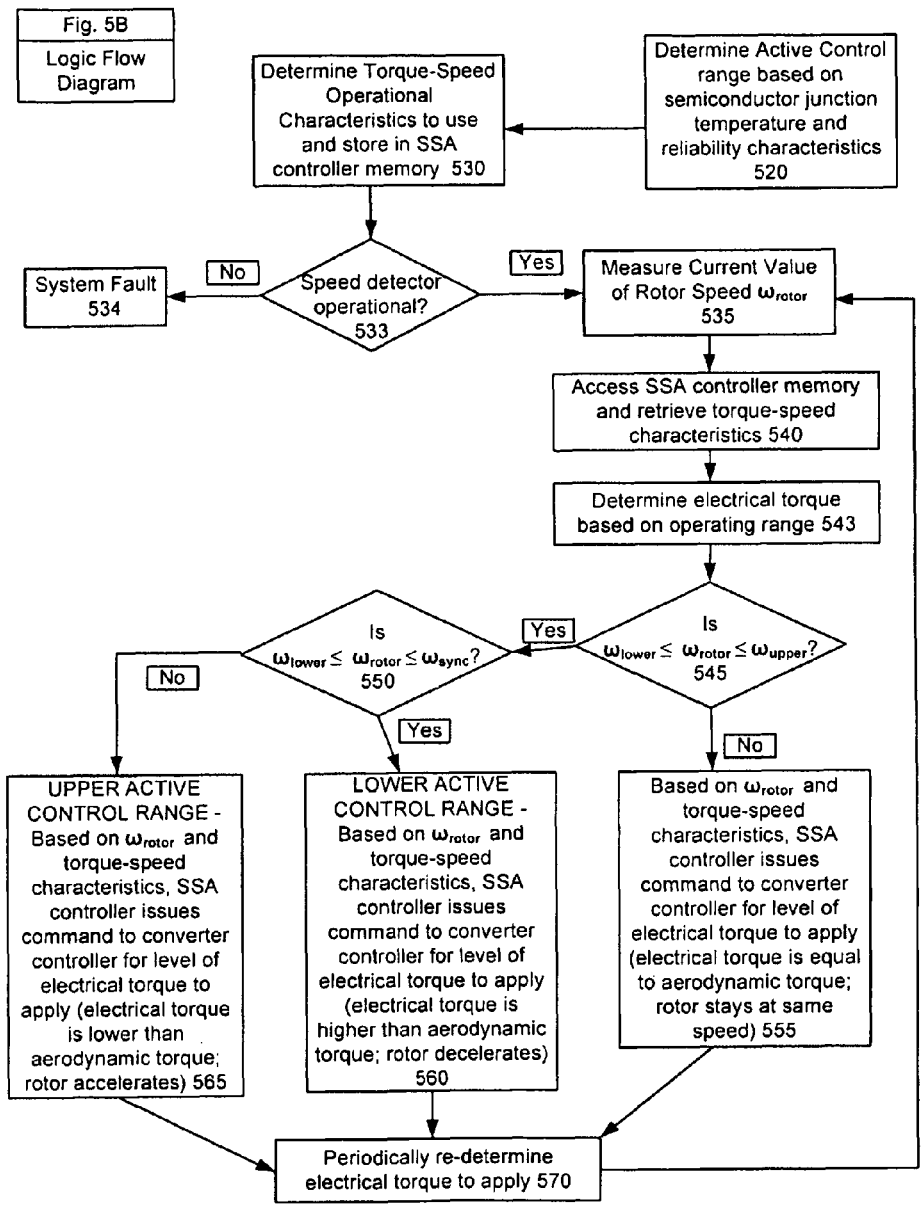

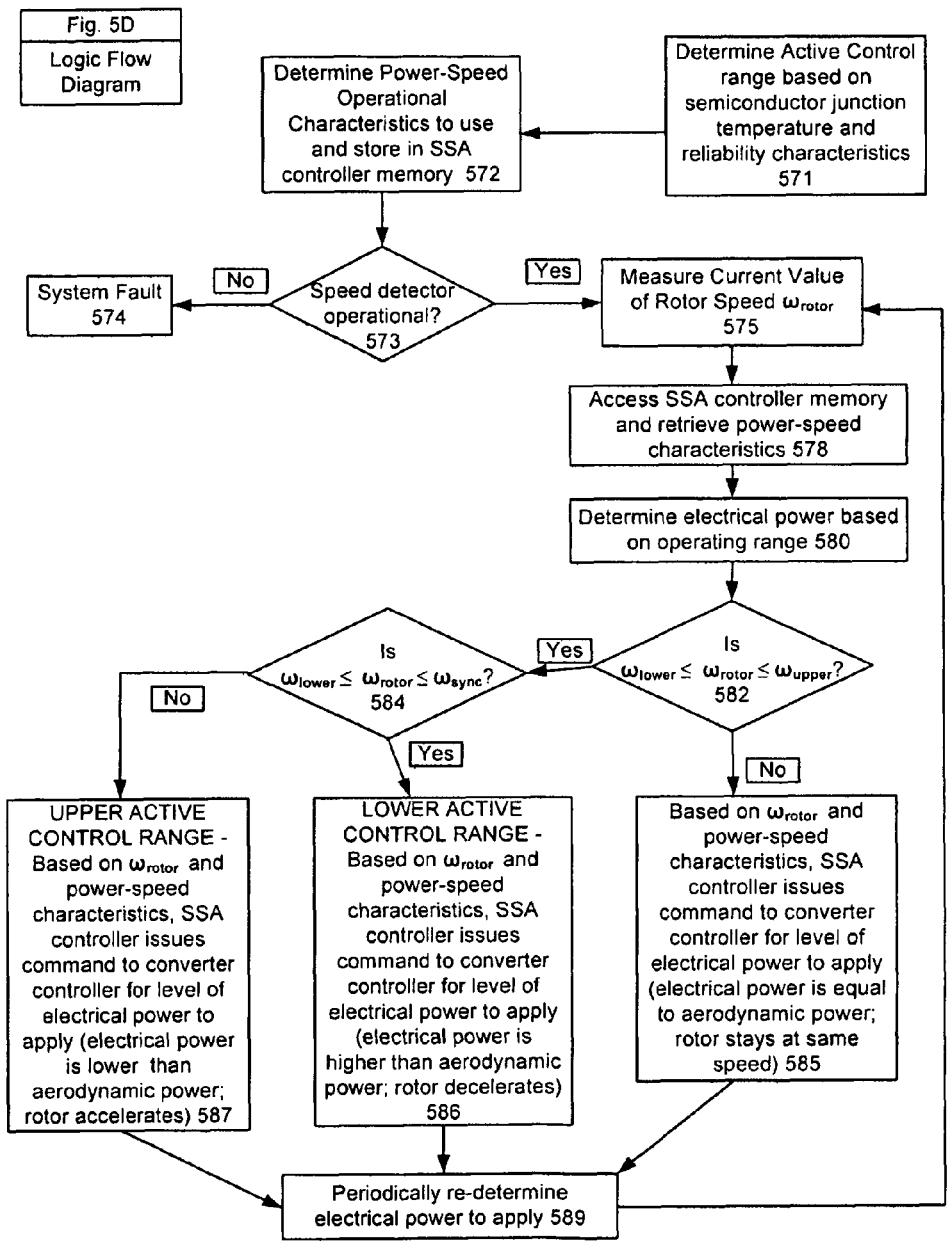

SYSTEMS AND METHODS FOR SYNCHRONOUS SPEED AVOIDANCE IN DOUBLY-FED INDUCTION GENERATORS

This disclosure claims priority to under 35 U.S.C. §119(e) and incorporates by reference U.S. Provisional Patent Application titled "Synchronous Speed Avoidance Logic for Doubly Fed Induction Generator," filed May 30, 2007, as Ser. No. 60/932,593.

FIELD

The present disclosure is generally directed to apparatuses, methods and systems configured to facilitate efficient operational characteristics in variable speed power generation systems, and more particularly, to apparatuses, methods and systems for controlling the power converter components of doubly-fed induction generator systems.

BACKGROUND

As the use of variable speed power generation systems increases, solutions are necessary to facilitate efficient operational characteristics for power converters associated with the power generation systems. One aspect of facilitating efficient operational characteristics in the generators relates to providing consistent generator operation in a variety of operational circumstances. In some generator implementations, the power converter may encounter certain operational issues that lead to significant spikes in power transistor junction temperatures. One cause for these high junction temperatures is prolonged operation of the rotor side converter of the power converter at rotor frequencies at or close to zero, i.e., prolonged operation of the rotor of the generator at rotor speeds at or close to the generator synchronous speed. High transient junction temperatures may lead to power semiconductor failure, based on a number of causes including stress due to the different temperature expansion coefficients of the various materials in the power semiconductor package.

SUMMARY

The disclosure details implementations of apparatuses, methods, and systems for facilitating efficient operational characteristics for wind turbine generators. Aspects of the system may include features directed to protecting the power semiconductors used in the power converters of variable speed power generation systems from excessive junction temperatures. High junction temperatures may result from prolonged operation of the rotor side converter at rotor frequencies at or close to zero. Conventionally, power converter designers of variable speed power generation systems may have selected power semiconductors with oversized current ratings to deal with increased temperature fluctuations during operation. However, using power semiconductors with higher current ratings than necessary, may result in significant increases in the initial cost of a variable speed power generation system.

In one embodiment, the disclosure discusses aspects of apparatuses, methods, and systems that facilitate efficient operational characteristics, including features that facilitate protecting the power semiconductors used in the power converters of variable speed power generation systems from excessive junction temperatures. These features may be achieved by implementing a synchronous speed avoidance (hereinafter "SSA") controller. The generator synchronous speed is normally defined to be the speed at which the rotational speed of the magnetic field of the stator of the generator is equal to the rotational speed of the rotor of the generator.

In one embodiment, the SSA controller may be implemented in the form of an electrical torque-generator rotor speed (hereinafter "torque-speed") controller that may regulate the electrical torque and generator rotor speed operational characteristics of the power converter of the variable speed generator. These operational characteristics may be achieved in accordance with a determined torque-speed curve, function or look-up table that depends on temperature junction and reliability characteristics of the semiconductors used in the power converter and implements an unstable rotor speed operating range as an active control range centered around the generator synchronous speed. In a further embodiment, the SSA controller may be implemented in the form of an electrical power-rotor speed controller and the various parameters discussed below would be in the power context. In one non-limiting example, the unstable operating range centered around the generator synchronous speed of the determined torque-speed function may include a sub-range within the unstable operating range/active control range, wherein the torque decreases linearly with increasing rotor speed. In one implementation, the lowest value of the unstable operating rotor speed range may be 1-10 percent lower than the generator synchronous speed and the highest value of the unstable operating rotor speed range may be 1-10 percent higher than the generator synchronous speed. It is to be understood that depending on the actual implementation and the semiconductor characteristics associated with elements in the power converter (e.g., the semiconductor current ratings, operational junction temperature characteristics and/or reliability characteristics) the size of the active control range may vary between a variety of ranges (e.g., 0-1 percent; 0-2 percent; 0-3 percent; 0-4 percent; 0-5 percent; 0-6 percent; 0-7 percent; 0-8 percent; 0-9 percent; 0-10 percent; 0-11 percent; or any number of sub-ranges therein).

BRIEF DESCRIPTION OF THE DRAWINGS

The accompanying drawings illustrate various non-limiting, representative, inventive aspects in accordance with the present disclosure:

FIGS. 2A-2B are circuit diagrams illustrating aspects of a synchronous speed avoidance controller according to an implementation of the system within a doubly-fed induction generator;

FIGS. 4A-4F illustrate aspects of determining an active control range associated with a torque-speed function that may be used by the synchronous speed avoidance controller for protecting power converter components from excessive junction temperatures; and FIGS. 5A-5F illustrate further aspects of a synchronous speed avoidance controller that may control the torque-speed or power-speed operational characteristics of a power converter of a doubly-fed induction generator according to implementations of the system.

Figure 1:
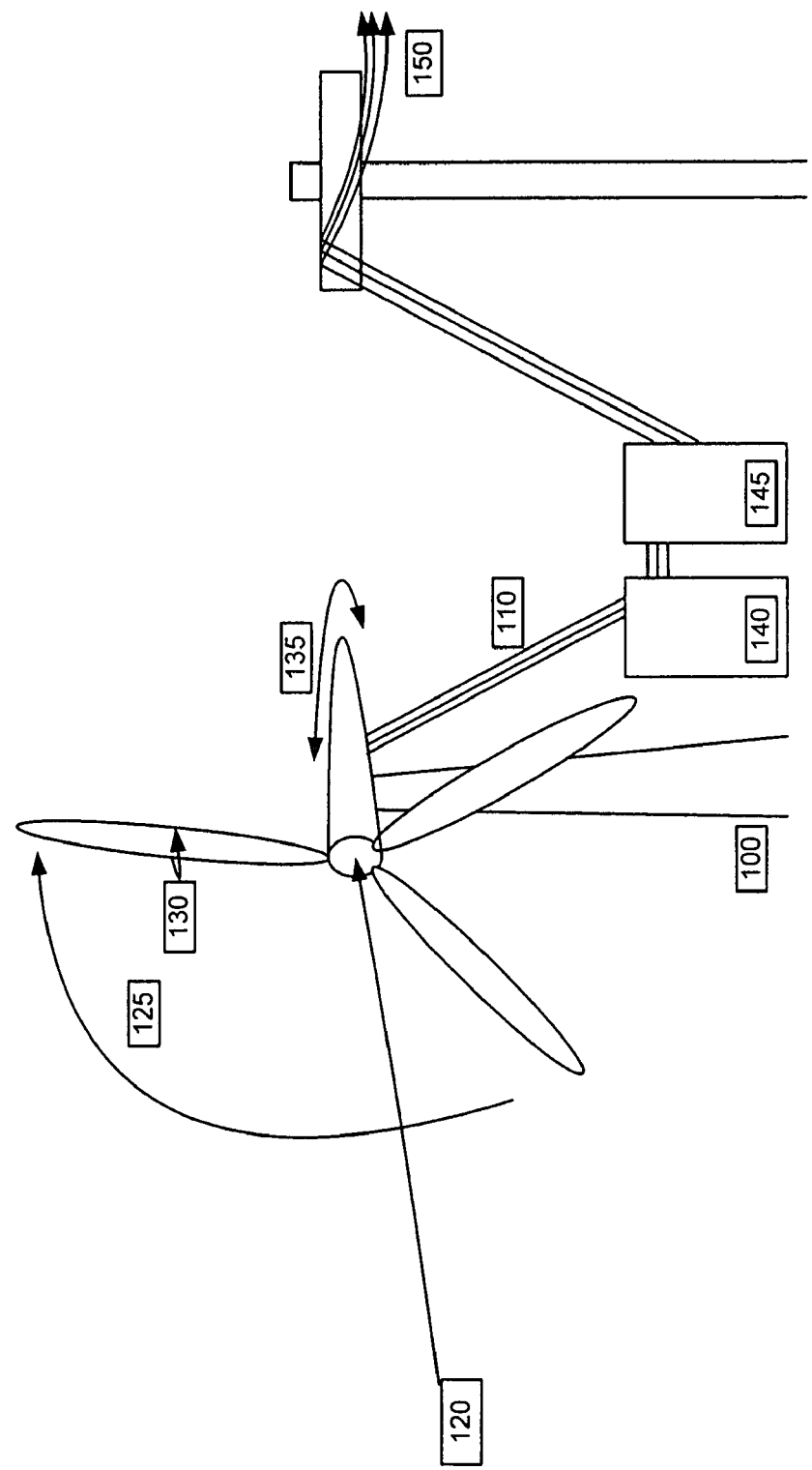
FIG. 1 is an overview of components of a variable speed wind turbine power generation system.

The leading number of each reference numeral indicates the first drawing in which that reference numeral is introduced. For example, wind turbine generator 100 is first introduced in FIG. 1.

DETAILED DESCRIPTION

Various implementations of synchronous speed avoidance ("SSA") systems facilitate determining a turbine active control range that facilitates controlling and regulating the junction temperatures of power semiconductors used in the power converters of variable speed generators. For the purposes of illustration, various aspects of an SSA system will be described in the context of an implementation of the SSA within a doubly-fed induction generator system used as an electrical generator in a wind turbine. However, it is to be understood that although the following description discusses regulating the junction temperatures of power semiconductors in a doubly-fed induction generator, the SSA facilitates significant flexibility and aspects of the system and various SSA components may be configured to control and regulate power converter operational characteristics in a wide variety of variable speed generation systems.

FIG. 1 provides an overview of components of a variable speed wind turbine power generation system. According to an implementation, a variable speed wind turbine generator 100 may be configured with a variety of sub-systems. These sub-systems may be controlled in coordination in order to improve the efficiency and quality of the power generated by turbine 100. For example, external sensors and/or systems such as a yaw control unit, a turbine blade pitch control system, a rotor speed detection system (that may determine the turbine rotor speed and/or the generator rotor speed) and/or a synchronous speed avoidance system may be controlled in order to maximize the efficiency of generating power from a wind stream, as well as prolong the viable operation of various system components.

For example, in an implementation of the system, the yaw control system may be manipulated based on feedback from wind direction and/or wind speed detectors and configured to rotate the turbine rotor in the direction of arrow 135. In this implementation, the turbine rotor is able to achieve an optimal angle with regard to the direction of a wind stream 120. Feedback from the wind direction/speed detectors may be used to assist in controlling the pitch of the turbine blade 130 with regard to the direction or speed of wind stream 120. The turbine blade pitch control system may also utilize a sensor measurement of the turbine rotor speed in revolutions per minute, in order to determine the tip speed of a turbine blade 125. This type of data may be used by other wind turbine systems, such as the wind turbine controller. For example, the sensor measurement of the generator rotor speed in revolutions per minute may also be utilized by a synchronous speed avoidance (SSA) component in coordination with power converter characteristics to determine an active control range ensuring generator operation at rotor speeds higher or lower than the generator synchronous speed. This facilitates protecting the power semiconductors used in the power converter of the wind turbine from the risk of excessive junction temperatures due to prolonged operational time at or near synchronous speed. Aspects of SSA components will be discussed in greater detail below.

Further efficiency gains may be realized by a turbine controller managing a power converter control system 140 that prepares the electricity generated by the turbine's generator for transfer to the turbine's transformer 145 and subsequently to a utility's power grid 150.

Depending on the particular implementation, the turbine controller, blade pitch controller, synchronous speed avoidance controller, or other system controllers may be implemented and configured in a variety of ways. The turbine controller (as well as the other subsystem controllers, for example a synchronous speed avoidance controller) may serve to aggregate, execute, generate, identify, instruct, match, process, search, store, select, serve, and/or facilitate interactions with a computer configured to manage and coordinate various aspects of the functionality/features associated with operating a wind turbine, some of which are described in greater detail below.

Typically, users, which may be people and/or other systems, engage information technology systems (e.g., commonly networked or stand-alone computers or microcontrollers) to facilitate information processing. In turn, computers employ processors and other system components to process information; such processors are often referred to as central processing units (CPU). A common form of processor is referred to as a microprocessor. CPUs use communicative instructions to enable various system operations and may be utilized by a wind turbine system administrator to configure a microcontroller to execute a variety of turbine control features. Such communicative instructions may be stored and/or transmitted in batches in system memory as program and/or data components to facilitate desired operations.

These stored instructions may engage the CPU circuit or other system components to perform desired operations. A common type of program is a computer operating system, which, commonly, is executed by CPU on a computer or microcontroller; the operating system enables and facilitates users to access and operate computer information technology and resources. Common resources employed in information technology systems include: input and output mechanisms through which data may pass into and out of a computer; memory storage into which data may be saved; and processors by which information may be processed. In some implementations, the information technology systems may include interfaces for facilitating communication between the microcontroller with a variety of sensors or sub-systems and/or a system user interface/terminal. Often information technology systems are used to collect data for later retrieval, analysis, and manipulation, commonly, which may be facilitated through a database program. Information technology systems may provide similar interfaces that allow users to access and operate various system components.

In one embodiment, the turbine controller and/or the SSA may be connected to and/or communicate with entities such as, but not limited to: one or more users from user input devices; peripheral devices; one or more sensors; a variety of control systems; and/or a communications network.

The turbine controller, blade pitch controller, synchronous speed avoidance controller, or other system controllers may be based on a variety of computer systems that may comprise, but are not limited to, components such as: a computer systemization connected to memory. A computer systemization may comprise a clock, central processing unit (CPU), a read only memory (ROM), a random access memory (RAM), and/or an interface bus, and most frequently, although not necessarily, are all interconnected and/or communicating through a system bus that may in turn be connected with a variety of system sensors or components. Optionally, the computer systemization may be connected to an internal power source. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive instructions or data embodying various system information throughout the system. Such transmission and reception of instructions or data embodying information throughout a computer systemization may be commonly referred to as communications. These communicative instructions/data may further be transmitted, received, processed and the cause of return and/or reply communications beyond the instant computer systemization to: communications networks, input devices, other computer systemizations or controllers, systems components, systems sensors, systems control sub-systems, peripheral devices, and/or the like. Of course, any of the above components may be connected directly to one another, connected to the CPU, and/or organized in numerous variations employed as exemplified by various computer systems.

The CPU comprises at least one processor or in some implementations a high-speed data processor adequate to execute program components for facilitating turbine control system functionality, executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the turbine controller, system primary and ancillary control systems, and beyond through various interfaces. Should processing requirements dictate a greater amount speed, parallel, mainframe and/or super-computer architectures may similarly be employed. Alternatively, should deployment requirements dictate greater portability or embedded control systems, smaller embedded microcontroller CPUs, and/or embedded control systems, may be employed.

Synchronous Speed Avoidance System Overview

Figure 2A:
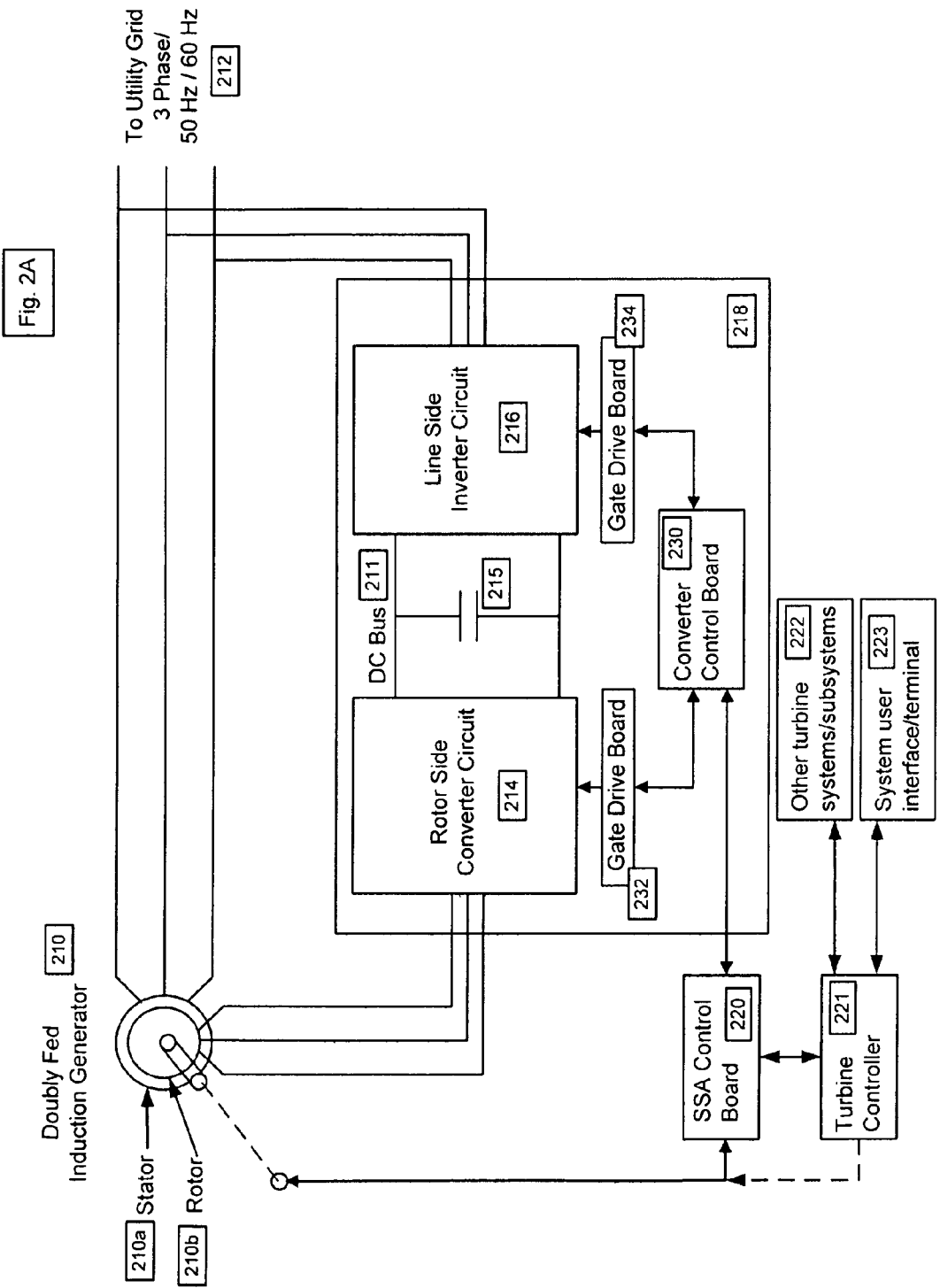

FIG. 2A is a circuit diagram illustrating a synchronous speed avoidance (SSA) controller implemented in coordination with a power control circuit associated with a doubly-fed induction generator. As illustrated in FIG. 2A, elements of this configuration include a doubly-fed induction generator 210, a power converter circuit 218 and an SSA control board 220. The elements of the induction generator 210 include a stator 210a coupled to a rotor 210b—the terminology "doubly-fed" denotes the fact that the induction generator 210 has two electrical connections: one at the stator 210a, and one at the rotor 210b. More specifically, in one implementation, the stator 210a circuit may be directly connected to a utility three phase system 212, and the rotor 210b circuit may be connected to a rotor power converter circuit 214. Depending on the implementation, the SSA control board 220 may also be implemented to communicate with a turbine controller 221, other turbine systems/sub-systems 222 and/or a system user interface 223.

In one implementation, a magnetic field is normally established by the stator 210a winding and currents are generated in the rotor 210b winding as a result of electromagnetic induction. The principle of electromagnetic induction normally requires a time-varying magnetic field to be established at the induction generator—in one implementation, this may be achieved by having the rotor 210b rotate at a speed that is asynchronous to the speed of the magnetic field established by the stator 210a winding. A term that is widely used to define the characteristics of induction generators is that of the slip of the generator. Generator slip parameters define the relative difference between the rotational speed of the magnetic field of the stator 210a and the rotational speed of the rotor 210b. The rotational speed at which the slip is zero, (i.e., the difference of the rotational speed of the magnetic field of the stator 210a and the rotational speed of the rotor 210b is zero), is usually referred to as the generator synchronous speed. For example, when the utility grid frequency is 50 Hz, the rotational speed of the magnetic field at the stator 210a may be 1000 revolutions per minute if the stator has six poles, and in turn the generator synchronous speed will also be 1000 revolutions per minute. In an alternative configuration, when the utility grid frequency is 50 Hz and the stator of the generator has four poles, the rotational speed of the magnetic field of the stator 210a and the generator synchronous speed may be 1500 revolutions per minute.

The doubly-fed induction generator system has gained popularity in wind energy applications, because the power converter 218 that includes a rotor side converter 214 and a line side inverter 216 connected by DC bus 211, may be implemented to facilitate variable speed control of a much larger induction generator 210. In doubly-fed induction generator implementations, the size of the power converter circuit 218 may be proportional to the operational slip parameters of the induction generator 210. For example, if the generator is rated at 1.5 megawatts and has a maximum 33% slip during operation, then the power converter 218 can be rated at 33% of 1.5 megawatts, or 500 kilowatts. This facilitates a relatively inexpensive converter, particularly when compared to a fully rated converter circuit which would have to be rated at the same level as the generator power level.

In one embodiment, the induction generator 210 is configured to convert the turbine's mechanical energy into AC electrical energy in either the stator 210a, the rotor 210b, or both. The generated AC voltage may vary, in terms of magnitude and frequency, as compared with the relatively constant utility grid voltage. As such, it may be necessary to modify the magnitude and/or frequency characteristics of the generated AC voltage before incorporating it with the electrical grid. The power converter circuit 218 may be configured to change the time-domain characteristics of the variable frequency and/or magnitude AC voltage in order to make the generated power compatible with the utility grid. In one implementation, the power converter circuit 218 is configured to first convert the AC voltage to DC voltage, and subsequently the DC voltage is then converted back to AC voltage of fixed frequency and magnitude—as such the power converter 218 is configured as an AC/DC/AC converter.

In another implementation, the rotor side converter 214 may be configured to convert the variable frequency and magnitude AC voltage to DC voltage, wherein the DC electrical energy from the rotor side converter 214 output may be temporarily stored in the DC bus 211 within the electric field of a capacitor bank 215 or in the magnetic field of an inductor. In one embodiment, the AC voltage from the output of the line side inverter 216 may be fed to an AC line filter that may be configured to smooth out and stabilize sinusoidal characteristics of the AC voltage. In a further embodiment, a transformer may be used to step up the voltage characteristics of the AC line filter output for transmission to the utility grid.

In one implementation illustrated in FIG. 2B, the rotor side converter circuit 214 and the line side inverter circuit 216 (which form power converter 218) are configured with components that include power transistors 217, such as Insulated-Gate Bipolar Transistors (IGBTs), and flyback diodes 219. In one implementation, a converter control board 230 may be configured to coordinate operation of the gate drive boards 232/234 associated with power converter 218 in order to control the AC/DC/AC operational characteristics of the power converter 218.

In a further implementation, an SSA control board 220 (or in some implementations turbine controller 221 or other turbine systems/subsystems 222) may monitor and control the speed and position of the rotor 210*b,* as well as facilitate application of electrical torque to the generator by applying appropriate levels of active current to the rotor 210*b.* In some implementations, the SSA control board 220 communicates with turbine controller 221 and/or other turbine systems/subsystems 222 to facilitate interaction with the rotor and stator. For example, the SSA control board 220 may communicate with a turbine speed determination component through turbine controller 221 to monitor the speed of the rotor 210*b.* Rotor speed data may be used to control the torque-speed operational characteristics of the generator in accordance with a determined torque-speed curve, function and/or look-up table by the converter control board 230. It is to be understood that electrical power is equal to electrical torque multiplied by the generator rotor speed. Accordingly, in an embodiment, the rotor speed data may be used to control the torque-speed operational characteristics of the generator (and in the turn the electrical power-rotor speed operational characteristics) in accordance with a determined electrical power-rotor speed curve, function and/or look-up table by the converter control board 230. Ultimately, the converter control board 230 may apply appropriate levels of electrical torque (or induce appropriate levels of electrical power) by controlling the levels of active current applied to the rotor 210*b.* In one implementation, SSA control board works in coordination with the converter control board to determine an active control range and facilitate application of torque instructions to achieve operational characteristics that avoid operation at or near synchronous speed, or zero slip. In some implementations, the SSA control board 220 may also be implemented as part of the converter control board 230. In further implementations, the turbine controller 221 may be configured to monitor the level of the generator output power, compare it to a reference power value corresponding to the current generator rotor speed and issue appropriate commands for increasing or decreasing the rotor speed accordingly.

In an implementation, the line side inverter 216 may operate at the utility grid frequency, $f_{grid}$, (e.g., 60 Hz or 50 Hz), and the rotor side converter 214 may operate at a generator rotor frequency, $f_{rotor}$, that relates to the grid frequency, the generator synchronous speed, $\omega_{sync}$, generator rotor speed, $\omega_{rotor}$ and generator slip, S, as follows:

$$f_{rotor} = f_{grid} \cdot \left| \frac{\omega_{sync} - \omega_{rotor}}{\omega_{sync}} \right| = f_{grid} \cdot S$$

As shown in the above equation, the rotor frequency is equal to the product of the grid frequency and the slip of the generator. In typical doubly-fed induction generator implementations, the generator rotor speed may vary by 25-30% with respect to the generator synchronous speed, i.e., the slip of the generator is 25-30%. Using the above expression, when the generator rotor speed is equal to the generator synchronous speed, the rotor frequency is zero—when the slip of the generator is zero, the rotor voltages and currents are DC quantities. Further, when the rotor speed is equal to zero, the rotor frequency is equal to the grid frequency. The slip of the generator may reach values of up to 30%. As such, with the grid frequency at 50 Hz, the generator rotor frequency may vary from 0-15 Hz.

Figure 3A:
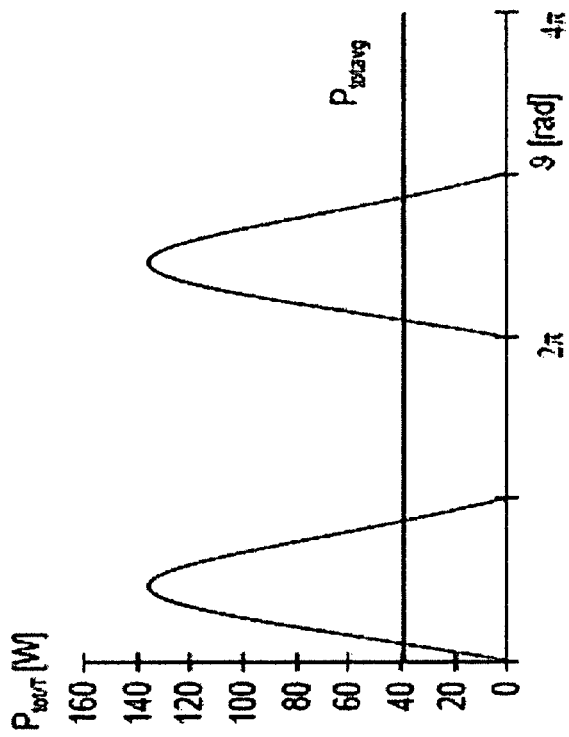
FIGS. 3A-3B illustrate junction temperature and power dissipation operational characteristics for the power semiconductors that may be used in a power converter of a doubly-fed induction generator according to an implementation of the system.
Figure 3B:
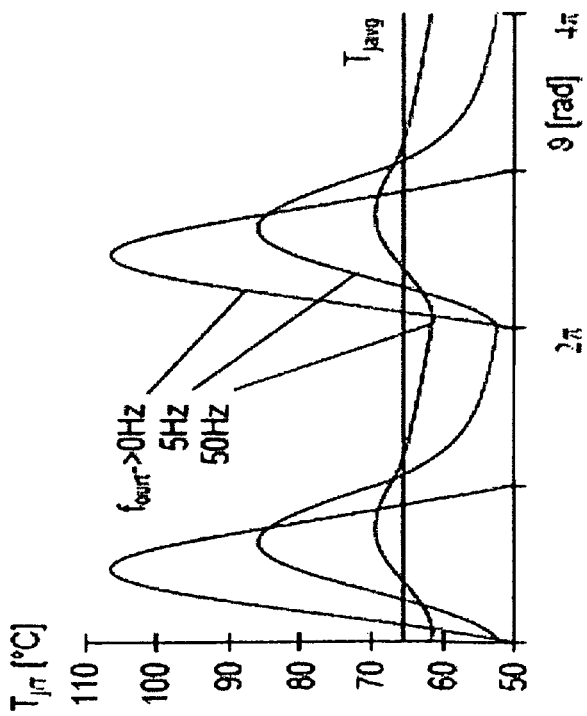

FIGS. 3A-3B illustrate junction temperature and power dissipation operational characteristics for the power semiconductors 217 that may be used in a power converter 218 of a doubly-fed induction generator (e.g., as illustrated in FIGS. 2A-2B). For a given root-mean-square (RMS) current, FIG. 3A illustrates the variation of the junction temperature of the power semiconductors 217 (measured in Celsius) for three fundamental frequencies of operation: 50 Hz, 5 Hz and 0 Hz. As illustrated, the power semiconductors 217 may experience higher transient junction temperatures at lower fundamental frequencies. In particular, as the fundamental frequency at which the power semiconductor operates approaches 0 Hz, the difference in the peak junction temperature relative to the average junction temperature becomes quite high. As illustrated in FIG. 3A, at a frequency of 50 Hz, the maximum junction temperature may exceed the average junction temperature by only about 5 C. However, at a frequency of 0 Hz, the maximum junction temperature may exceed the average junction temperature by about 40 C and operate at temperatures greater than 100 C. Furthermore, FIG. 3B shows that as the fundamental frequency at which the power semiconductor operates approaches 0 Hz, the difference in peak power dissipation relative to the average power dissipation also becomes quite high. These operational characteristics result in significantly high risks of power converter component failure.

FIGS. 3A-3B thus provide a detailed picture of the operational characteristics of the power semiconductors 217 used within a power converter 218. When generator operation is such that the rotor frequency is at or close to 0 Hz, one of the two power semiconductors 217 in each leg of the rotor side converter 214 (shown in the dashed box of FIG. 2B) may operate at a high duty cycle and for a period which is long with respect to the time constant of the power semiconductor transient junction-to-case thermal impedance. This, in effect, may result in high transient junction temperatures that can lead to power semiconductor failure based on factors including stress due to the different temperature expansion coefficients of the various materials comprising the power semiconductor package.

Conventionally, power semiconductors 217 used in power converters had been selected with higher current ratings because both their average junction temperatures and their transient junction temperature variations are lower for every fundamental frequency of operation. Using power semiconductors 217 with higher current rating, however, may result in significant increases in the initial cost of components associated with a doubly-fed induction generator system.

In a variable speed power generation system, electrical power is generated by controlling the power converter 218 through the converter control board 230 to apply appropriate levels of electrical torque in order to counteract the aerodynamic torque produced by the rotational motion of the rotor 210*b*. The electrical torque may be used to increase or decrease the rotor speed to provide consistent operational characteristics when the rotor speed is within an active control range of the synchronous speed. In one implementation, the converter control board 230 may apply appropriate levels of electrical torque by controlling the levels of active current applied to the rotor 210*b*.

Figure 4A:
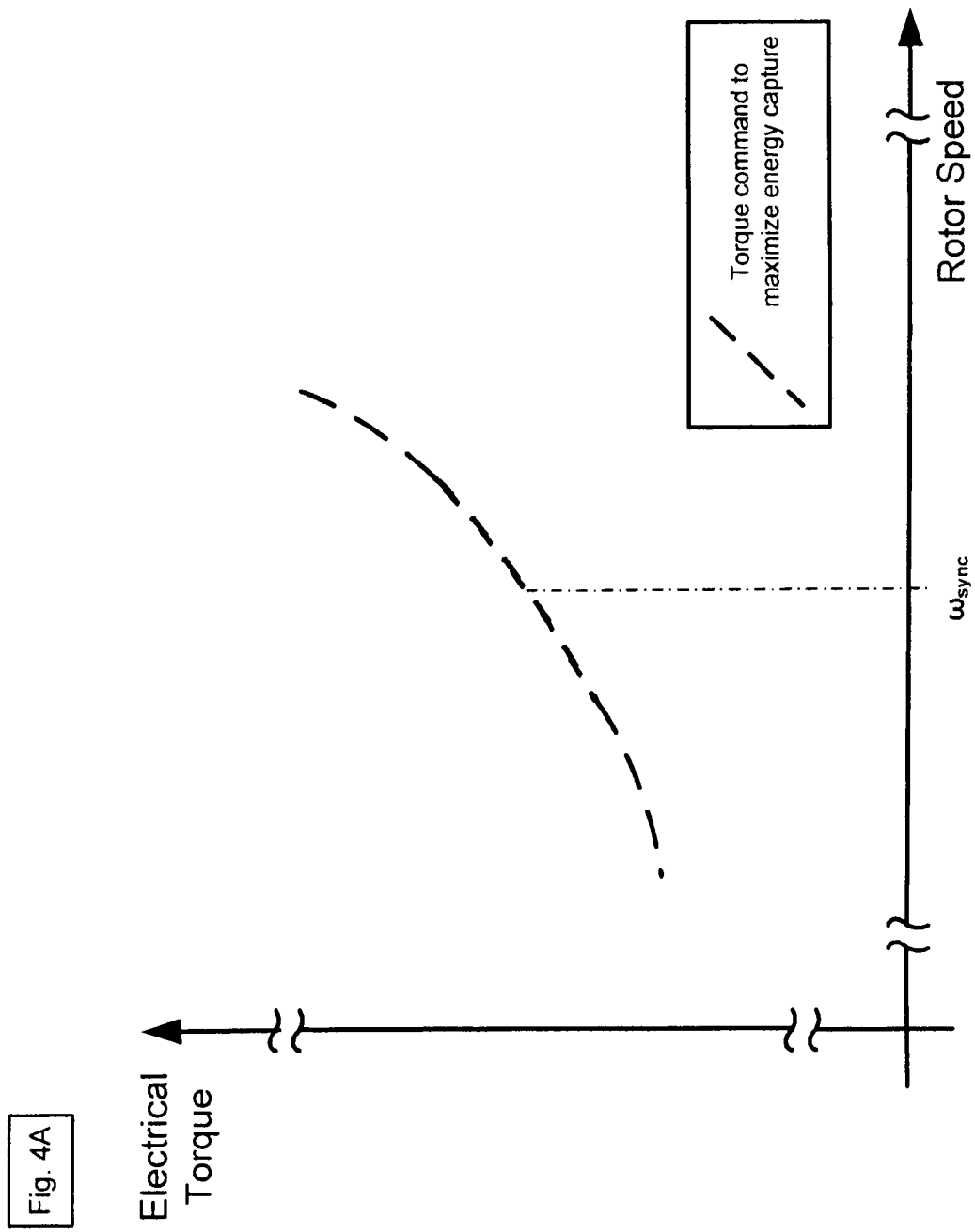

In order to maximize efficiency, the generator rotor speed may be allowed to vary with the prevailing wind speed, and a unique electrical torque may be applied for each rotor speed that extracts maximum electrical power from the available wind power. In some implementations, there may be several operating regions for the doubly-fed induction generator that depend on the prevailing wind speed. For example, in a first operating region, the wind speed is below a cut-in threshold and as such, the doubly-fed induction generator does not operate. As the wind speed increases, the generator may enter a second operating region in which the rotor speed varies in direct proportion to the wind speed. This maintains a constant, optimal blade tip speed ratio for the rotor, which in turn optimizes energy capture. In this second operating region, the aerodynamic torque provided by the rotor 210*b* normally varies as the square of the generator rotor speed. An example of a torque-speed function that may be used by an SSA control board 220 in this second operating region to control the applied electrical torque in order to maximize energy capture is provided in FIG. 4A. As illustrated in FIG. 4A, the applied electrical torque also varies as the square of the generator rotor speed.

FIGS. 4A-4F illustrates aspects of the power semiconductor junction temperature characteristics plots of FIG. 3A, as related to determining the SSA active control range. As already discussed, FIG. 4A illustrates torque-speed operational characteristics in the form of a torque-speed function that may be facilitated by the SSA controller in order to maximize energy capture and optimize the performance of the wind turbine generator. Maximizing energy capture though the use of the torque-speed function of FIG. 4A may lead to high transient semiconductor temperature problems, however, if there is continued operation at or quite close to the generator synchronous speed, $\omega_{sync}$. As discussed above, in the second operating region (illustrated in FIG. 4A) the rotor speed is directly proportional to the wind speed. So, if the wind speed remains constant at, or close to a corresponding proportional value of $\omega_{sync}$, the generator rotor speed would remain approximately constant at or close to $\omega_{sync}$, which could be problematic and lead to transient temperature spikes and possible power converter component failures.

In one embodiment, an active control range based on power converter component characteristics/wind turbine operational characteristics is determined to protect the power semiconductors of a power converter from excessive junction temperatures and is facilitated through the use of an SSA controller 220. The SSA controller facilitates an active control range where the SSA actively accelerates/decelerates the rotor speed. Based on the determined active control range, the SSA controller may generate electrical torque control instructions for the converter control board 230 in accordance with the torque-speed operational characteristics of the function illustrated in FIG. 4F. When the SSA operates in accordance with the function of FIG. 4F, it facilitates a deadband (unstable operating range), as the determined active control range from $\omega_{lower}$ to $\omega_{upper}$, that encompasses the generator synchronous speed $\omega_{sync}$. The negative slope of the torque-speed function within the deadband surrounding $\omega_{sync}$, in FIG. 4F results in an unstable operating range.

For example, when the rotor speed is in the lower active control range (between $\omega_{lower}$ and $\omega_{sync}$), the SSA controller instructs the converter control board to apply an electrical torque that exceeds in value the aerodynamic torque that may be applied by the rotor 210*b*, causing the rotor to decelerate to a speed below $\omega_{lower}$. On the other hand, when the rotor speed is in the upper active control range (between $\omega_{sync}$ and $\omega_{upper}$), the SSA controller instructs the converter control board to apply an electrical torque that is lower in value than the aerodynamic torque exerted by the rotor 210*b*, resulting in rotor acceleration to a speed greater than $\omega_{upper}$. In some implementations, features of the SSA controller may be incorporated with the converter control board to facilitate the active control range and turbine operations discussed herein.

Figure 4C:
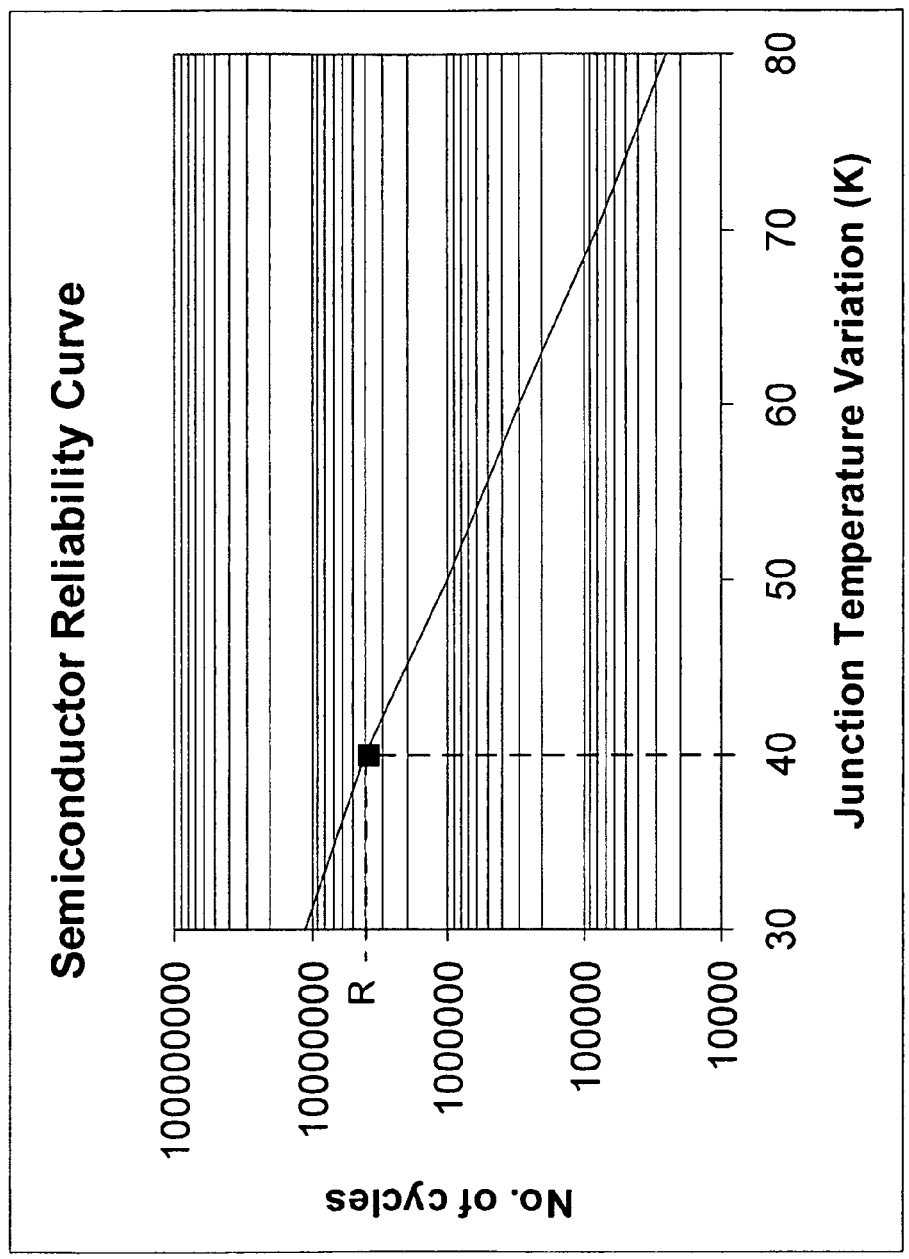
Figure 4E:
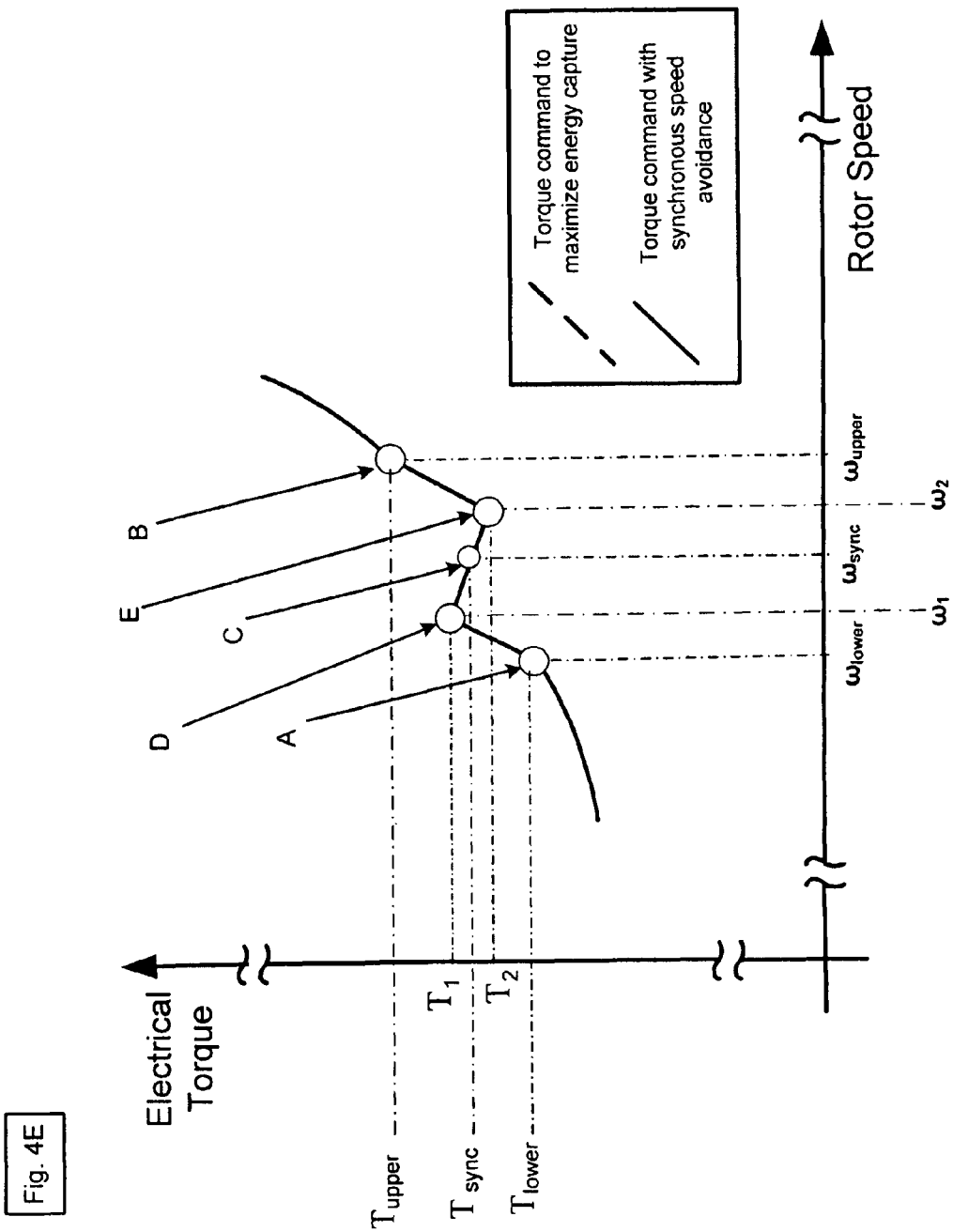

Therefore, by regulating the electrical torque through an SSA controller in accordance with the torque-speed function of FIG. 4F, operation at rotor speeds between $\omega_{lower}$ and $\omega_{upper}$ is minimized/avoided and the maximum transient junction temperature of the power semiconductors 217 of the rotor side converter 214 remains close to the average junction temperature. FIG. 4E illustrates five operational points (points indicated as A-E) that are determined and implemented as the active control range in accordance with electrical system component characteristics and acceptable turbine operational characteristics associated with a particular implementation.

FIG. 4B is a logic flow diagram describing aspects of the active control range determination process. In one implementation, a system administrator may first access semiconductor data 217 associated with the components used in the power converters of the generator, such as semiconductor performance characteristics including junction temperature characteristics, reliability curves, current ratings, and/or the like. The performance characteristics of the identified power semiconductors may be stored in the SSA controller memory 505. A system administrator may then access the practical implementation doubly-fed induction generator design and determine the expected life span of the implementation 408 and establish the minimum acceptable number of life-cycles for the power semiconductors used in the power converter 510. For example, if the expected useful life span of the wind turbine and associated components is desired to be at least 10 years, the wind turbine may be estimated to operate approximately half of that time, i.e., 5 years, and only about half of the operational time is estimated to be operating at full power, i.e., 2.5 years. Furthermore, if the average rotor frequency is 5 Hz, it may be estimated that only 1% of the time would the system operate at that frequency of 5 Hz, i.e., 0.025 years. Accordingly, the desired life time for the semiconductor components in terms of seconds is equal to 788,400 seconds (i.e., 60*60*24*365*0.025). The desired life time in seconds may be multiplied by the frequency in order to obtain the desired number of life-cycles. In our example, the desired number of life-cycles would be equal to 3,942,000. It is to be understood that the above life-cycle calculation may be specific to the deployment site of the wind turbines. For example, in some deployment sites the wind turbines may be expected to operate approximately 90% and in others 25% of the time.

In a further implementation, and by way of example only, the number of desired life-cycles for the power semiconductors used in the power converter of the generator may be estimated at 4,000,000. Semiconductor reliability curve data, such as that displayed in FIG. 4C, is then retrieved 412 and an acceptable semiconductor junction temperature variation based on the established number of life-cycles from the retrieved semiconductor reliability data 415 is derived. Using our earlier example, when the minimum acceptable number of life-cycles for the power semiconductors is estimated at 4,000,000 (indicated by point R on the y-axis of FIG. 4C), it may be derived that the semiconductor junction temperature variation has to be less than or equal to 40 degrees Kelvin (or equivalently 40 degrees Celsius). Although aspects of the determination are discussed herein with an implementation that includes a system administrator, it is to be understood that based on initial estimated lifecycle data, many aspects of the active control range determination may involve system-driven data analysis/determination.

Semiconductor junction temperature characteristic data for specific operating frequencies, such as those of FIG. 3A, may then be retrieved 618 to derive an active control trigger rotor frequency based on the junction temperature versus frequency data and the determined semiconductor junction temperature variation. For example, if the determined semiconductor junction temperature variation is 40 degrees Celsius, it may be derived, using stored data associated with the graph from FIG. 3A, that the semiconductor junction temperature variation when the operating frequency is 5 Hz is a bit less than 40 degrees Celsius. Accordingly, the SSA controller may be configured with the active control trigger rotor frequency in an implementation that is 5 Hz and stores this value in the SSA controller memory. In one implementation, the determined active control trigger frequency and other turbine active control metrics may be provided to the SSA system administrator for approval 422. A system administrator may approve the determined value for the active control trigger rotor frequency or edit the values to incorporate additional buffers. For example, initiating a redetermination of the active control range based on implementing power semiconductors with a higher current rating (thereby increasing component costs, but decreasing the active control range).

The SSA may be configured to store the approved value in the SSA controller memory. In further implementations, the system administrator may even determine that the power semiconductors used in the current design implementation of the doubly-fed induction generator are not appropriate and have to be replaced with semiconductors with higher or lower current ratings 423 and determine a new active control range accordingly. In one embodiment, the initial design implementation uses power semiconductors with the lowest current rating in order to minimize cost. The system administrator assesses whether these semiconductors with the lowest current rating are appropriate by using the process described in FIG. 4B. If they are inappropriate, the system administrator changes the design implementation to incorporate power semiconductors with higher current rating. In alternate embodiments, an active control range determination module may be configured to analyze power semiconductor data and determine the active control range for a particular implementation and/or set of power semiconductors. Normally, power semiconductors with higher current ratings have lower average junction temperatures and lower junction temperature deviations from the average value for all fundamental frequencies of operation but may be significantly more expensive than power semiconductors with lower current ratings.

Recall that the generator rotor frequency, $f_{rotor}$, is related to the grid frequency, the generator synchronous speed, $\omega_{sync}$ and generator rotor speed, $\omega_{rotor}$, as follows:

$$f_{rotor} = f_{grid} \cdot \left| \frac{\omega_{sync} - \omega_{rotor}}{\omega_{sync}} \right|$$

An active control rotor speed range is determined 425 by defining upper and lower bounds ($\omega_{lower}$ and $\omega_{upper}$ as indicated by points A and B respectively in FIG. 4D) for the active control rotor speed range based on the determined value, $f_{trigger}$, of the active control trigger rotor frequency stored in memory and the following two variants of the above equation:

$$\omega_{lower} = \omega_{sync} \cdot \left(1 - \frac{f_{trigger}}{f_{grid}}\right); \text{ and}$$

$$\omega_{upper} = \omega_{sync} \cdot \left(1 + \frac{f_{trigger}}{f_{grid}}\right)$$

Assuming that the grid frequency is equal to 50 Hz and the generator synchronous speed is equal to 1000 revolutions per minute, using the SSA stored active control trigger frequency of 5 Hz from our earlier example, the upper and lower bounds of the active control generator rotor speed range as follows:

$$\omega_{lower} = 1000 \text{ rpm} \cdot \left(1 - \frac{5 \text{ Hz}}{50 \text{ Hz}}\right) = 900 \text{ rpm};$$

$$\omega_{upper} = 1000 \text{ rpm} \cdot \left(1 + \frac{5 \text{ Hz}}{50 \text{ Hz}}\right) = 1100 \text{ rpm}$$

In one implementation, a system administrator may derive and store in the SSA controller memory electrical torque values corresponding to generator rotor speeds lower than $\omega_{lower}$, higher than $\omega_{upper}$, and equal to $\omega_{sync}$ (as indicated by the range lower than point A, the range higher than point B, and point C in FIG. 4D) that are equal in value to the aerodynamic torque that may be applied by the rotor 210b and are proportional to the square of the rotor speed. The determined torque-speed points are illustrated by the dashed line of FIG. 4D and the points A, B and C. For our example, where $\omega_{lower}$ and $\omega_{upper}$ are 10% lower and 10% higher than the generator synchronous speed, $\omega_{sync}$, respectively, the corresponding computed values for the electrical torque would be $T_{lower}=0.81 \, T_{sync}$ and $T_{upper}=1.21 \, T_{sync}$.

As described above, when the rotor speed is in the lower active control range (between $\omega_{lower}$ and $\omega_{sync}$), the SSA controller instructs the converter control board to apply an electrical torque that exceeds in value the aerodynamic torque that may be applied by the rotor 210b. When the rotor speed is in the upper active control range (between $\omega_{sync}$ and $\omega_{upper}$), the SSA controller instructs the converter control board to apply an electrical torque that is lower in value than the aerodynamic torque exerted by the rotor 210b, resulting in rotor acceleration to a speed greater than $\omega_{upper}$.

The aerodynamic torque exerted by the rotor 210b, in both the active and non-active control ranges, is proportional to the square of the rotor speed. In one implementation, the SSA controller may be configured to determine appropriate torque-speed characteristics as described in this paragraph (and as illustrated in FIG. 4E) by first determining a peak point D in the lower active control rotor speed range and a nadir point E in the upper active control rotor speed range 430. In one implementation, the electrical torque value $T_1$ for point D may be computed by the SSA controller as 10% higher than the torque value $T_{sync}$ corresponding to the synchronous generator speed, and the electrical torque value $T_2$ for point E may be computed as 10% lower than the torque value $T_{sync}$. In further implementations, the electrical torque value $T_1$ for point D may be configured to have any value between $T_{sync}$ and $T_{upper}$, and the electrical torque value $T_2$ for point E may be configured to have any value between $T_{sync}$ and $T_{lower}$.

The corresponding rotor speed values for points D and E may be determined by the SSA controller as 5% lower and 5% higher, respectively, than the synchronous generator speed. In one implementation, the SSA controller may be configured to derive the complete torque-speed characteristics by joining points A and D, D and C, C and E, and E and B by straight lines, as illustrated in FIG. 4E and then store the torque-speed operational characteristics in the SSA controller memory in the form of a curve, function, and/or look-up table. In further implementations, the SSA controller may be configured to join the aforementioned sequences of torque-speed points by lines other than straight lines (e.g., parabolic) as long as the electrical torque is higher in value than the aerodynamic torque in the lower active control range and is lower in value than the aerodynamic torque in the upper active control range.

In alternative implementations and depending on the semiconductor junction temperature and reliability characteristics, the lowest value of the active control range, $\omega_{lower}$, may be 1-10 percent lower than the generator synchronous speed, $\omega_{sync}$, and the highest value of the active control range, $\omega_{upper}$, may be 1-10 percent higher than the generator synchronous speed. It is to be understood that depending on the actual implementation and the semiconductor characteristics associated with elements in the power converter (e.g., the semiconductor current ratings) the size of the active control range may vary between a variety of ranges. (e.g., 0-1 percent; 0-2 percent; 0-3 percent; 0-4 percent; 0-5 percent; 0-6 percent; 0-7 percent; 0-8 percent; 0-9 percent; 0-10 percent; 0-11 percent; or any number of sub-ranges therein). The electrical torque and corresponding rotor speed values for the peak point D and the nadir point E may also be derived accordingly by the SSA controller.

As already described in the context of FIG. 2A, an SSA control board 220 may be implemented to facilitate the determined active control range. Depending on the particular implementation, the SSA may facilitate torque-speed control to implement the active control or power-speed control that regulates the electrical torque or electrical power and rotor speed operational characteristics of the power converter of the doubly-fed induction generator 210 according to a determined torque-speed or power-speed curve, function and/or look-up table. The corresponding torque/power values are derived from a determination that the rotor speed is within the SSA determined active control range.

For the purposes of illustration, various aspects of the SSA control board 220 will be described in the context of determining the active control range and facilitating torque-speed controller within a doubly-fed induction generator system used as an electrical generator in a wind turbine. However, it is to be understood that although the following description discusses controlling operational characteristics according to a determined torque-speed curve, it is to be understood that the SSA control board 220 facilitates significant flexibility in that it can also be implemented as an electrical power-rotor speed controller or as an active rotor current-rotor speed controller.

Figure 5A:
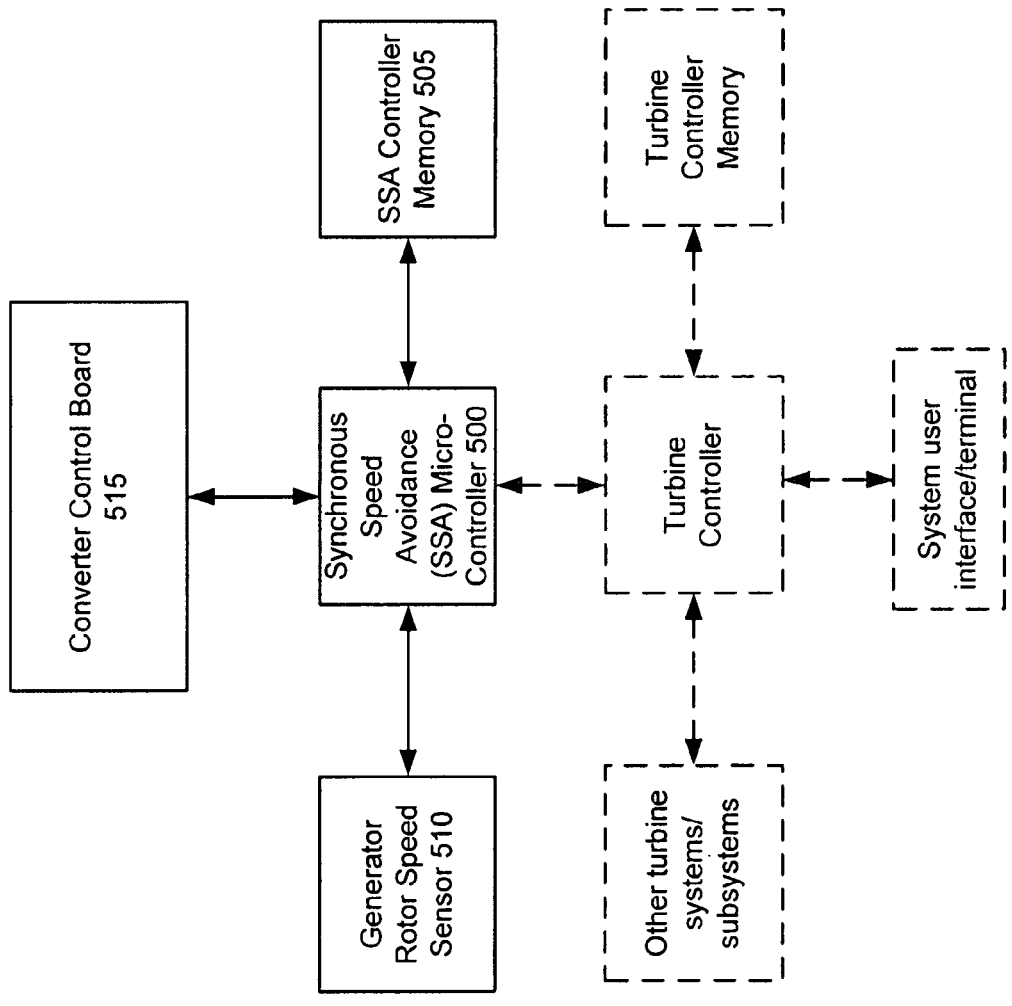

FIG. 5A illustrates an implementation of the SSA controller implemented as a micro-controller 500 operatively in communication with SSA controller memory 505 and connected to a generator rotor speed sensor component 510. SSA controller memory 505 may be configured to store a variety of control instructions based on a determined active control range which facilitates achieving active control range operational characteristics for a particular implementation. Some of the data stored in SSA controller memory may include, but is not limited to: the value of the generator synchronous speed, the desired torque-speed operational characteristics within the determined active control range (such as those provided in FIGS. 4A and 4F), a current value of the generator rotor speed, past values of the generator rotor speed, periodic re-assessment measurement variables and/or any other number of possible operational variables.

In one implementation, the generator rotor speed sensor component 510 may provide a current value of the generator rotor speed to the SSA micro-controller every few milliseconds. Based on the current value of the rotor speed provided by the rotor speed sensor 510 and the determined active control range and the defined torque-speed operational characteristics stored in the SSA controller memory 505, the SSA micro-controller 500 may determine the level of electrical torque that should be applied to the generator and may send a corresponding torque control command to the converter control board 515. In one implementation, the converter control board 415 may apply the appropriate level of electrical torque by controlling the active current applied to the rotor of the generator.

Depending on the particular implementation, features of the SSA controller may be achieved by implementing a micro-controller such as Intel's 8051 micro-controller. Some implementations may also rely on Digital Signal Processing ("DSP"), Field Programmable Gate Array ("FPGA"), and/or Application-Specific Integrated Circuit ("ASIC") technology to implement certain features of the SSA controller.

For example, a MC68HC16 microcontroller, commonly manufactured by Motorola Inc., may be implemented as an SSA controller. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Alternately, some implementations of the SSA controller may be configured with DSP Components that are configured and used to achieve a variety of features or signal processing. Depending on the particular implementation, DSP components may include software solutions, hardware solutions, or some combination of both hardware/software solutions.

Alternately, SSA features discussed herein may be achieved through implementing field-programmable gate arrays (FPGAs), which are a semiconductor devices containing programmable logic components called "logic blocks", and programmable interconnects, such as the high performance FPGA Virtex series and/or the low cost Spartan series manufactured by Xilinx. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory.

A hierarchy of programmable interconnects allow logic blocks to be interconnected as needed by the SSA system designer/administrator, somewhat like a one-chip programmable breadboard. Logic blocks and interconnects can be programmed by the customer or designer, after the FPGA is manufactured, to implement any logical function. Alternate or coordinating implementations may implement DC CPC controller features on application-specific integrated circuit (ASIC), instead of or in addition to FPGAs. The SSA controllers may be developed on regular FPGAs and then migrated into a fixed version that more resembles an ASIC implementations.

FIG. 5B illustrates aspects of a logic flow diagram associated with operation of the SSA control board 220 according to an implementation of the system. As described earlier, based on the semiconductor temperature junction characteristics such as those of FIG. 3A, the semiconductor reliability characteristics/data such as those of FIG. 4B, the current rating data of the power semiconductors, and the value of the generator synchronous speed, an active control generator rotor speed range 520 is determined, where the rotor speed varies from $\omega_{lower}$ to $\omega_{upper}$.

Based on the value of the generator synchronous speed and the determined active control range, the SSA controller 220 may be configured to determine and store in the controller memory 530 acceptable torque-speed operational characteristics for operation when the rotor speed falls within the determined active control range. In one implementation, the acceptable torque-speed operational characteristics may be in the form of a function such as that illustrated in FIG. 4F. As discussed above, the reason for using a function such as that of FIG. 4F is to create an unstable operating range based on the system's electrical components for actively controlling rotor speed when the rotor speed varies from $\omega_{lower}$ to $\omega_{upper}$ and, in effect, a safe-harbor operational range around the generator synchronous speed $\omega_{sync}$. In another implementation, the SSA controller may store the acceptable torque-speed operational characteristics in the SSA controller memory in the form of a table such as Table 1. The generator synchronous speed in this implementation corresponds to 1000 revolutions per minute and the generator slip is equal to 33%, i.e., the lowest and highest rotor speed are 33% lower and higher than the generator synchronous speed respectively. Table 1 also provides electrical power-generator rotor speed and rotor active current-generator rotor speed characteristics that may be used by the SSA controller in alternative implementations.

TABLE 1

Synchronous Speed Avoidance Control Characteristics

| Wind Speed (m/sec) | Generator Rotor Speed (RPM) | Electrical Power (kW) | Electrical Torque (Nm) | Rotor Active Current (Amps) |
|---|---|---|---|---|
| 6 | 667 | 0 | 0 | 0 |
| 7 | 778 | 42 | 512 | 24 |
| 8 | 889 | 167 | 1791 | 83 |
| 8.47 | 940 | 521 | 4657 | 217 |
| 9 | 1000 | 375 | 3582 | 167 |
| 9.55 | 1060 | 271 | 2686.5 | 125 |
| 10 | 1111 | 667 | 5732 | 267 |
| 11 | 1222 | 1041 | 8142 | 379 |
| 12 | 1333 | 1500 | 10749 | 500 |

Figure 5C:
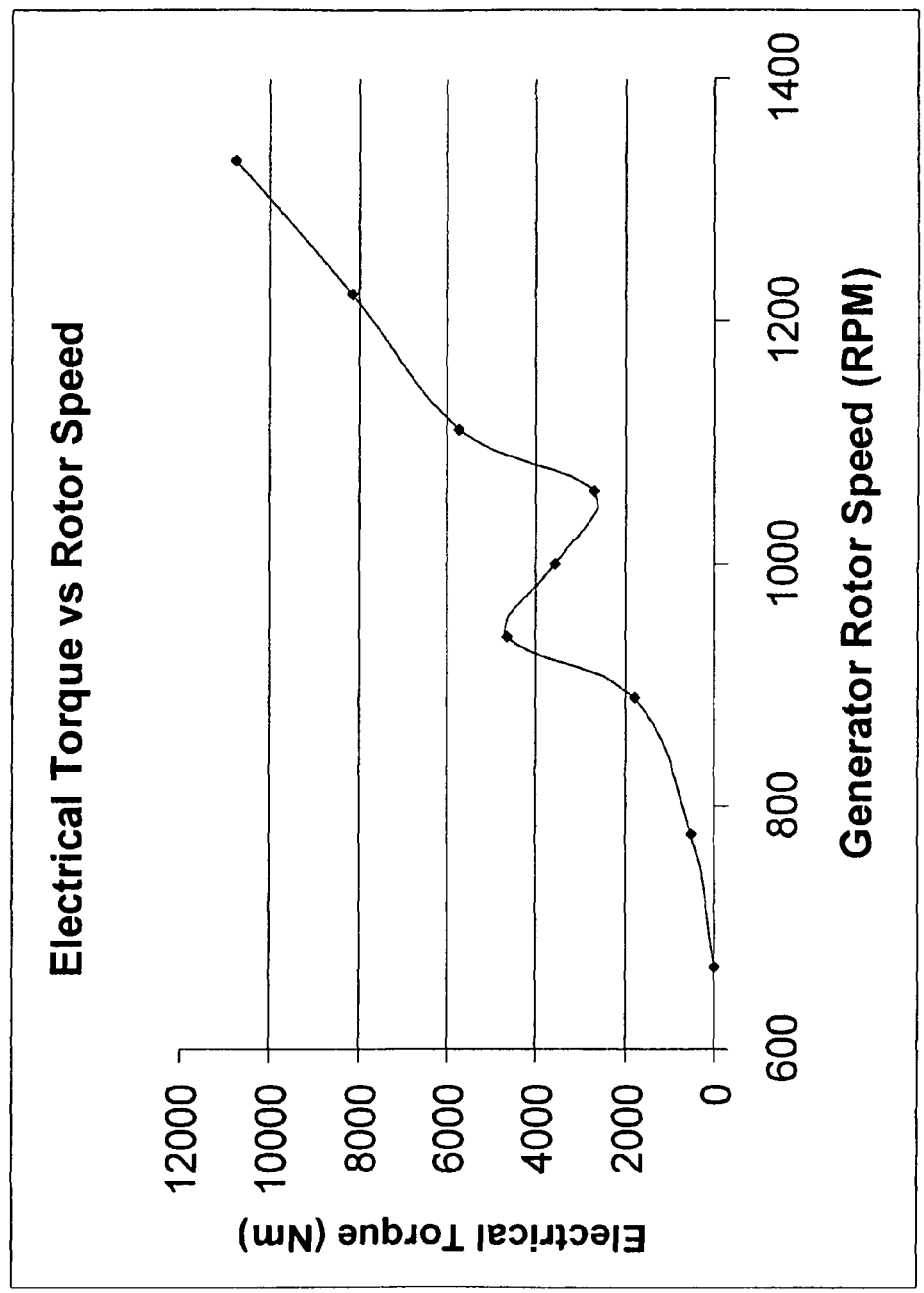

FIG. 5C provides the electrical torque-generator rotor speed curve that corresponds to the SSA control value characteristics of Table 1. The active control range in FIG. 5C includes the range around the generator synchronous speed (e.g., 1000 rpm) where the electrical torque that has to be applied decreases almost linearly with increasing generator rotor speed. The turbine controller may run a diagnostic or self-test to determine whether the rotor speed detection component is active and/or operating as expected 533. If the controller determines that the speed detection component is operating as expected, the speed detection component measures the current value of the rotor speed 535. If the rotor speed detection component is not active or the turbine controller detects erroneous data, the controller may raise a system fault and/or transmit an alert to a system administrator 534. For example, a speed sensor may be used for measuring the current value of the generator rotor speed. The speed sensor may be implemented as an encoder that measures the rotational speed of the rotor or a number of other possible implementations (e.g., a wind speed sensor, and/or the like).

The SSA controller then accesses the memory and retrieves the active control range data and corresponding torque-speed characteristics from the memory 540. Based on the current rotor speed, the retrieved active control range data and torque-speed operational characteristics, the SSA controller determines whether active control is necessary, and the corresponding value of the electrical torque for application to the generator 543, as well as the corresponding value of active rotor current that has to be applied to the rotor 210b of the generator 210.

If the current value of the rotor speed is not within the determined active control range of $\omega_{lower}$ to $\omega_{upper}$ 545, the SSA controller issues a command to the converter controller that includes the value of the electrical torque that the converter controller should apply during operation outside the determined active control range. In this range, the electrical torque applied is proportional to the square of the current value of the rotor speed and equal to the aerodynamic torque provided by the rotor, and therefore the rotor speed is maintained 555. If the current value of the rotor speed is within the determined active control range of $\omega_{lower}$ to $\omega_{upper}$ 545, the SSA controller further determines which side of $\omega_{sync}$ the rotor is currently operating in. If the current value of the rotor speed is within the lower active control range of $\omega_{lower}$ to $\omega_{sync}$ 550, the SSA controller uses the retrieved torque-speed characteristics and transmits an instruction to the converter controller with the appropriate level of electrical torque (or active rotor current) that has to be applied 560 to the generator. When the rotor speed is within the lower active control range $\omega_{lower}$ to $\omega_{sync}$) the level of the electrical torque is higher than the level of the aerodynamic torque, which results in rotor deceleration. If, however, the current value of the rotor speed is within the upper active control range of $\omega_{sync}$ to $\omega_{upper}$, the SSA controller issues a command to the converter controller that includes a level of electrical torque lower than the level of the aerodynamic torque, which results in rotor acceleration 565.

In any of the three cases described above, after the SSA controller issues an electrical torque command to the converter controller, it periodically re-determines the electrical torque that should be applied 570 by taking a measurement of the generator rotor speed 535. In one implementation, this periodic determination of the electrical torque to apply may happen every few milliseconds.

In another implementation the SSA controller may also be configured to control the electrical power-generator rotor speed characteristics or the active rotor current-generator rotor speed characteristics in order to effectuate operation that avoids generator rotor speeds close to the generator synchronous speed. FIG. 5D illustrates aspects of a logic flow diagram associated with operation of the SSA control board 220 according to an implementation of the system as a power-speed controller. As described earlier, based on the semiconductor temperature junction characteristics such as those of FIG. 3A, the semiconductor reliability characteristics such as those of FIG. 4B, the current ratings of the power semiconductors and the value of the generator synchronous speed, an active control generator rotor speed range is determined, where the rotor speed varies from $\omega_{lower}$ to $\omega_{upper}$.

Figure 5E:
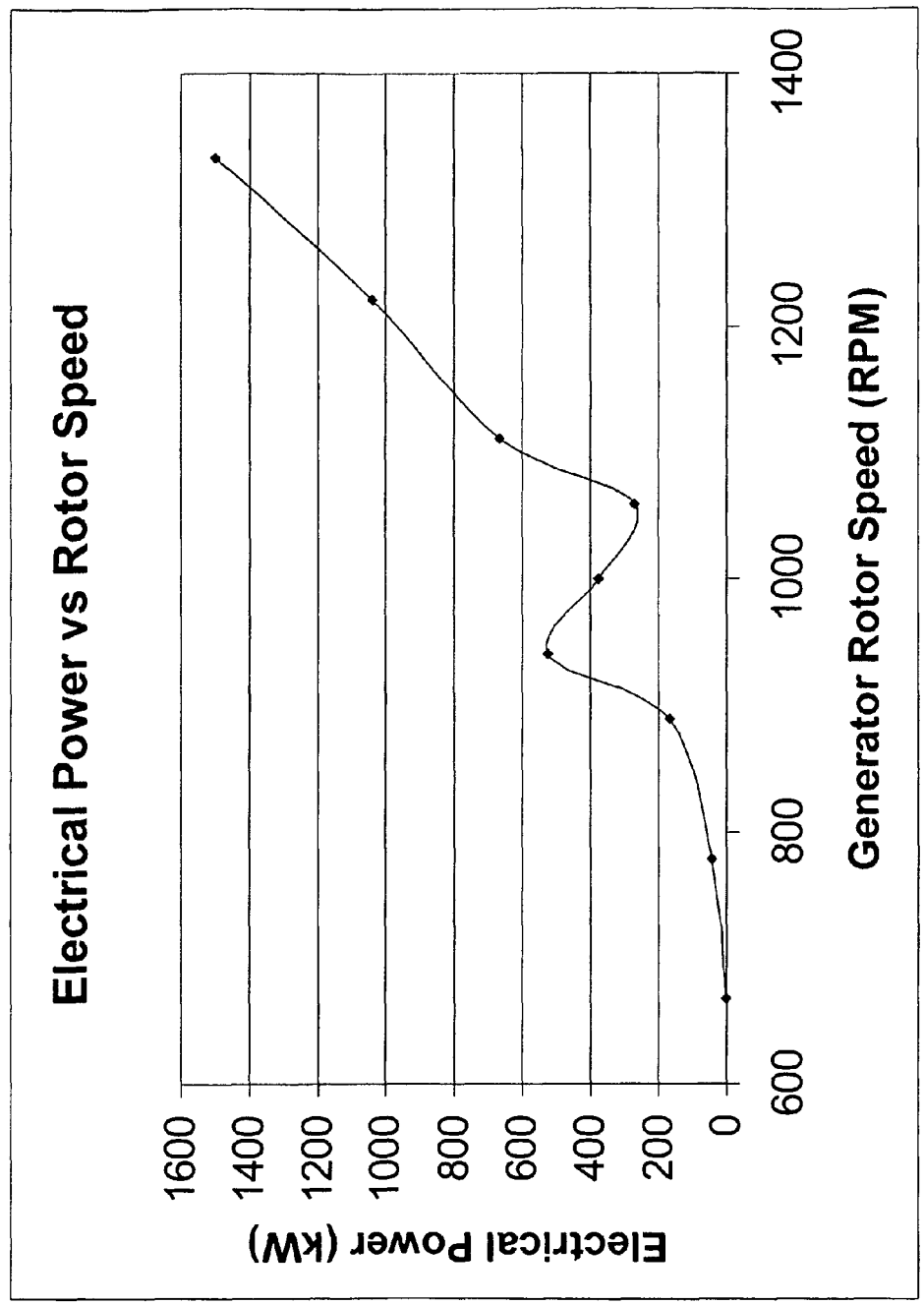

Based on the value of the generator synchronous speed and the determined active control range, the SSA controller 220 may be configured to determine and store in the controller memory acceptable power-speed operational characteristics (hereinafter "power regulation characteristics") for operation when the rotor speed falls within the determined active control range. In one implementation, the acceptable power-rotor speed operational characteristics may be stored in the controller memory in the form of a table such as Table 1, and in another implementation the acceptable power-speed characteristics may be stored in the controller memory in the form of a power-speed curve such as that illustrated in FIG. 5E.

If the current value of the rotor speed is not within the determined active control range of $\omega_{lower}$ to $\omega_{upper}$ 582, the SSA controller issues a command to the converter controller that includes the value of the electrical power that the converter controller should apply during operation outside the determined active control range. In this range, the electrical power applied is proportional to the cube of the current value of the generator rotor speed and equal to the aerodynamic power provided by the rotor, and therefore the rotor speed is maintained. If the current value of the rotor speed is within the determined active control range of $\omega_{lower}$ to $\omega_{upper}$ 582, the SSA controller further determines which side of $\omega_{sync}$ the rotor is currently operating in. When the rotor speed is within the lower active control range ($\omega_{lower}$ to $\omega_{sync}$) 584, the level of the electrical power applied is higher than the level of the aerodynamic power provided by the rotor, which results in rotor deceleration 586. If, however, the current value of the rotor speed is within the upper active control range of $\omega_{sync}$ to upper the SSA controller issues a command to the converter controller that includes a level of electrical power lower than the level of the aerodynamic power provided by the rotor, which results in rotor acceleration 587. As described above, in further implementation a turbine controller may monitor the level of the generator output power, compare it to a reference power value corresponding to the current generator rotor speed and issue further appropriate commands for increasing or decreasing the rotor speed accordingly.

Figure 5F:
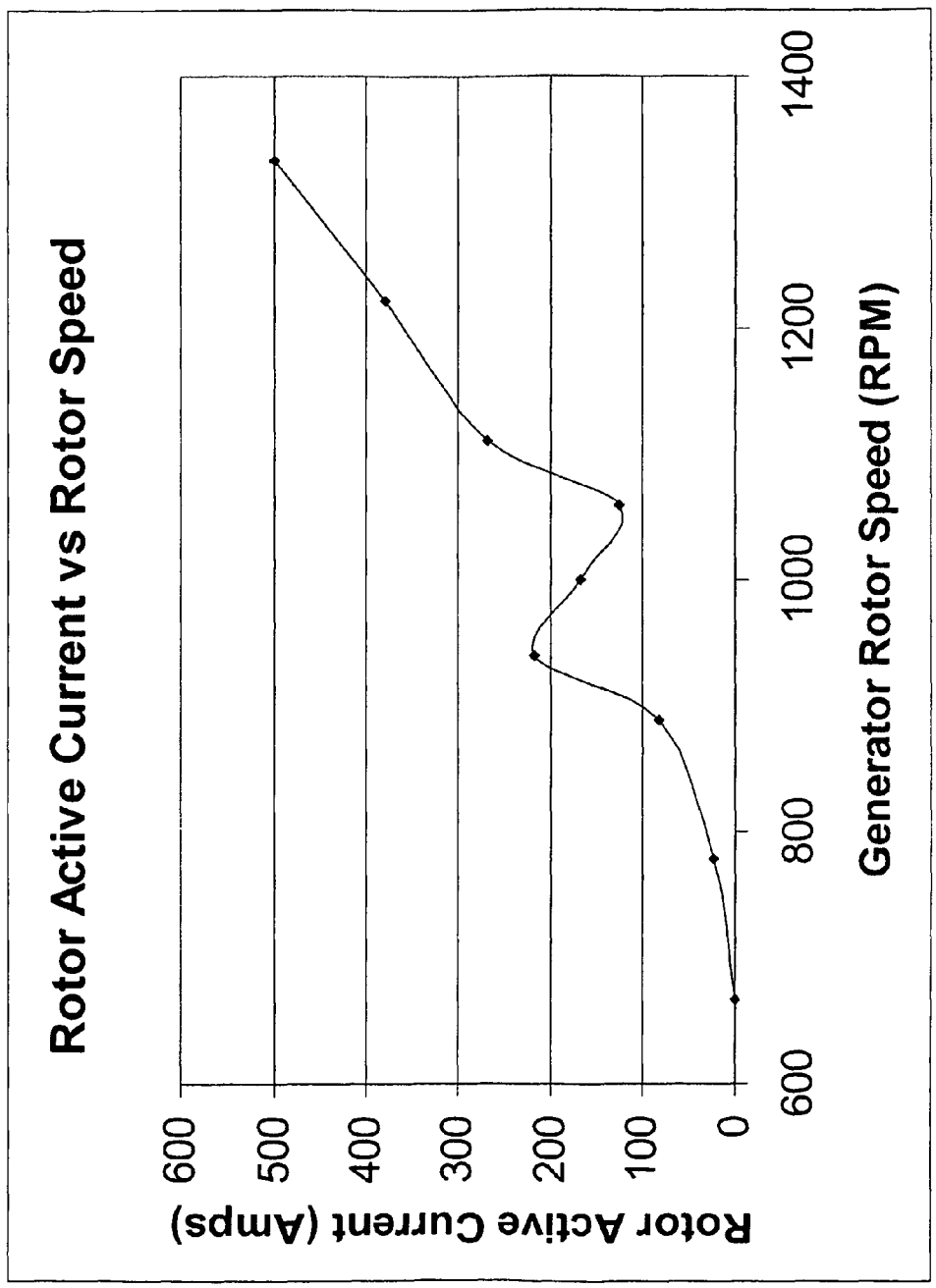

In another embodiment, the SSA controller may be configured to control the generator rotor speed by applying appropriate levels of active current to the rotor. FIG. 5F provides aspects of a rotor active current-generator rotor speed curve that corresponds to the data of Table 1 and may be used by the SSA controller to effectuate operation of the generator at rotor speeds outside the active control range. In one implementation, the SSA controller may be configured to derive the acceptable rotor active current values based on acceptable electrical torque-generator rotor speed characteristics such as those of FIG. 5C, and in another implementation, the SSA controller may be configured to determine the acceptable rotor active current values based on acceptable electrical power-generator rotor speed characteristics such as those of FIG. 5E.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

The invention claimed is:

1. A method of controlling a variable speed wind turbine generator, comprising:
    determining a generator rotor speed active control range and synchronous speed avoidance characteristics from system power semiconductor characteristics and a generator synchronous speed;
    determining a generator synchronous speed;
    determining a lower bound generator rotor speed value for the active control range based on operational junction temperature characteristics of power semiconductors used within a power converter associated with a doubly-fed induction generator, reliability characteristics of the power semiconductors and current ratings of the power semiconductors;
    determining an upper bound generator rotor speed value for the active control range based on operational junction temperature characteristics of power semiconductors used within a power converter associated with the doubly-fed induction generator, reliability characteristics of the power semiconductors and current ratings of the power semiconductors;
    accessing the determined generator rotor speed active control range and synchronous speed avoidance characteristics;
    comparing a current value of the generator rotor speed associated with the doubly-fed induction generator with the accessed determined rotor speed active control range; and
    controlling the generator rotor speed associated with the doubly-fed induction generator based on the determined active control range and synchronous speed avoidance characteristics.

2. The method of claim 1, wherein determining a generator rotor speed active control range further comprises establishing an acceptable minimum number of life-cycles for the power semiconductors used within the power converter.

3. The method of claim 2, wherein determining a generator rotor speed active control range further comprises deriving an acceptable semiconductor junction temperature variation based on the established acceptable minimum number of semiconductor life-cycles and the semiconductor reliability characteristics.

4. The method of claim 3, wherein determining a generator rotor speed active control range further comprises deriving an active control trigger rotor frequency based on the derived acceptable semiconductor junction temperature variation and the operational semiconductor junction temperature characteristics.

5. The method of claim 4, wherein the upper and lower bound generator rotor speed values are determined based on the derived active control trigger rotor frequency.

6. The method of claim 5, wherein the synchronous speed avoidance characteristics are determined to create an instability curve within the active control range that is determined by establishing a peak point and the corresponding rotor speed within a lower portion of the active control range and a nadir point and the corresponding rotor speed within an upper portion of the active control range,
wherein the lower portion of the active control range comprises generator rotor speeds within the active control range lower than the generator synchronous speed and equal to and greater than the lower bound generator active control range rotor speed value; and
wherein the upper portion of the active control range comprises generator rotor speeds within the active control range equal to or higher than the generator synchronous speed and equal to or less than the lower bound generator active control range rotor speed value.

7. The method of claim 6, wherein determining the synchronous speed avoidance characteristics further comprises:
accessing acceptable active control range electrical torque-rotor speed operational characteristics based on the generator synchronous speed, the lower and upper bound generator rotor speed values and the generator rotor speeds; and
storing the acceptable active control range electrical torque-rotor speed operational characteristics in system memory.

8. The method of claim 7, further comprising:
accessing a current value of the generator rotor speed;
determining if the current value of the generator rotor speed is within the active control range;
if the current value of the rotor speed is outside the active control range, applying electrical torque to the generator, based on the determined current value of the generator rotor speed and nominal electrical torque-rotor speed operational characteristics, in order to maintain the current generator rotor speed; and
if the current value of the generator rotor speed is within the active control range, applying electrical torque to the generator, based on the determined current value of the generator rotor speed and the determined electrical torque-rotor speed operational characteristics, in order to transition the generator rotor speed to a value outside the active control range.

9. The method of claim 8, wherein if the current value of the rotor speed is within the active control range and is lower than the generator synchronous speed, applying electrical torque to the generator which is higher than the aerodynamic torque of the rotor resulting in rotor deceleration to a rotor speed that is lower than the lower bound generator rotor speed value for the active control range.

10. The method of claim 9, wherein if the current value of the generator rotor speed is within the active control range and is higher than the generator synchronous speed, applying electrical torque to the generator which is lower than the aerodynamic torque of the rotor resulting in generator rotor acceleration to a generator rotor speed that is higher than the upper bound generator rotor speed value for the active control range.

11. The method of claim 10, wherein the active control range further comprises of an operating range centered around the generator synchronous speed and between the peak and nadir points wherein the electrical torque decreases linearly with increasing rotor speed.

12. The method of claim 8, wherein applying electrical torque to the generator comprises controlling the level of an active current applied to the rotor of the generator.

13. The method of claim 6, wherein determining the synchronous speed avoidance characteristics further comprises:
accessing acceptable active control range power regulation characteristics based on the generator synchronous speed, the lower and upper bound generator rotor speed values of the determined active control range, and the generator rotor speeds; and
storing the acceptable active control range power regulation characteristics in system memory.

14. The method of claim 13, further comprising:
accessing a current value of the generator rotor speed;
determining if the current value of the generator rotor speed is within the active control range;
if the current value of the rotor speed is outside the active control range, applying electrical power to the generator, based on the determined current value of the generator rotor speed and the power regulation characteristics, in order to maintain the current generator rotor speed; and
if the current value of the generator rotor speed is within the active control range, applying electrical power to the generator, based on the determined current value of the generator rotor speed and the determined power regulation characteristics, in order to transition the generator rotor speed to a value outside the active control range.

15. The method of claim 14, wherein if the current value of the generator rotor speed is within the active control range and is lower than the generator synchronous speed, applying electrical power to the generator that is higher than the aerodynamic power of the rotor resulting in rotor deceleration to a rotor speed that is lower than the lower bound generator rotor speed value for the active control range.

16. The method of claim 15, wherein if the current value of the generator rotor speed is within the active control range and is higher than the generator synchronous speed, applying electrical power to the generator which is lower than the aerodynamic power of the rotor resulting in generator rotor acceleration to a generator rotor speed that is higher than the upper bound generator rotor speed value for the active control range.

17. The method of claim 16, wherein the active control range further comprises of an operating range centered around the generator synchronous speed and between the peak and nadir points wherein the power regulation characteristic decreases linearly with increasing rotor speed.

18. The method of claim 14, wherein applying electrical power to the generator comprises controlling the level of an active current applied to the rotor of the generator.

19. A method of controlling a variable speed wind turbine generator, comprising:
accessing a determined generator rotor speed active control range and synchronous speed avoidance characteristics determined from operational junction temperature characteristics of power semiconductors used within a generator's power converter, reliability characteristics of the power semiconductors, current ratings of the power semiconductors and a generator synchronous speed value;
comparing a current value of the generator rotor speed associated with a doubly-fed induction generator with the accessed determined rotor speed active control range and synchronous speed avoidance characteristics; and controlling a generator rotor speed associated with a doubly-fed induction generator based on the determined active control range and synchronous speed avoidance characteristics.

20. The method of claim 19, wherein determining the generator rotor speed active control range and synchronous speed avoidance characteristics further comprises:
deriving an active control trigger rotor frequency based on generator slip characteristics, acceptable semiconductor junction temperature variation and operational semiconductor junction temperature characteristics, wherein the active control range upper and lower bound generator rotor speed values are determined based on the derived active control trigger rotor frequency.

21. The method of claim 20, further comprising:
accessing a current value of the generator rotor speed;
determining if the current value of the generator rotor speed is within the active control range;
if the current value of the generator rotor speed is outside the active control range, applying a generator rotor active current value to the generator rotor based on the determined current value of the generator rotor speed to maintain the current generator rotor speed; and
if the current value of the generator rotor speed is within the active control range, applying the generator rotor active current value to the generator rotor based on the determined current value of the generator rotor speed to transition the generator rotor speed to a value outside the active control range.

22. The method of claim 21, wherein if the current value of the generator rotor speed is within the active control range and is lower than the generator synchronous speed, applying the generator rotor active current value that is derived based on an acceptable electrical torque to the generator which is higher than the aerodynamic torque of the rotor resulting in rotor deceleration to a generator rotor speed that is lower than the lower bound generator rotor speed value for the determined active control range.

23. The method of claim 22, wherein if the current value of the generator rotor speed is within the active control range and is higher than the generator synchronous speed, applying the generator rotor active current value that is derived based on an acceptable electrical torque to the generator which is lower than the aerodynamic torque of the rotor resulting in rotor acceleration to a generator rotor speed that is higher than the upper bound generator rotor speed value for the determined active control range.

24. The method of claim 21, wherein if the current value of the generator rotor speed is within the active control range and is lower than the generator synchronous speed, applying the generator rotor active current value derived based on an acceptable power regulation characteristic wherein the electrical power applied to the generator is higher than the aerodynamic power of the rotor resulting in rotor deceleration to a generator rotor speed that is lower than the lower bound generator rotor speed value for the determined active control range.

25. The method of claim 22, wherein if the current value of the generator rotor speed is within the active control range and is higher than the generator synchronous speed, applying the generator rotor active current value derived based on an acceptable power regulation characteristic wherein the electrical power applied to the generator is lower than the aerodynamic power of the rotor resulting in rotor acceleration to a rotor speed that is higher than the upper bound generator rotor speed value for the determined active control range.

26. A system configured to control a variable speed wind turbine generator, comprising:
a processor;
a memory in communication with the processor, the memory for storing a plurality of processing instructions directing the processor to:
determine a generator rotor speed active control range and synchronous speed avoidance characteristics from system power semiconductor characteristics and a generator synchronous speed;
determine a generator synchronous speed;
determine a lower bound generator rotor speed value for the active control range based on operational junction temperature characteristics of power semiconductors used within a power converter associated with a doubly-fed induction generator, reliability characteristics of the power semiconductors and current ratings of the power semiconductors;
determine an upper bound generator rotor speed value for the active control range based on operational junction temperature characteristics of power semiconductors used within a power converter associated with the doubly-fed induction generator, reliability characteristics of the power semiconductors and current ratings of the power semiconductors;
the processor is further configured to generate instructions to:
access the determined generator rotor speed active control range and synchronous speed avoidance characteristics;
compare a current value of the generator rotor speed associated with the doubly-fed induction generator with the accessed determined rotor speed active control range; and
control the generator rotor speed associated with the doubly-fed induction generator based on the determined active control range and synchronous speed avoidance characteristics.

27. The system of claim 26, wherein determining a generator rotor speed active control range further comprises of the processor configured to generate instructions to establish an acceptable minimum number of life-cycles for the power semiconductors used within the power converter.

28. The system of claim 27, wherein determining a generator rotor speed active control range further comprises of the processor configured to generate instructions to derive an acceptable semiconductor junction temperature variation based on the established acceptable minimum number of semiconductor life-cycles and the semiconductor reliability characteristics.

29. The system of claim 28, wherein determining a generator rotor speed active control range further comprises of the processor configured to generate instructions to derive an active control trigger rotor frequency based on the derived acceptable semiconductor junction temperature variation and the operational semiconductor junction temperature characteristics.

30. The system of claim 29, wherein the processor is further configured to determine the upper and lower bound generator rotor speed values based on the derived active control trigger rotor frequency.

31. The system of claim 30, wherein the processor is configured to determine the synchronous speed avoidance characteristics by creating an instability curve within the active control range that is determined by establishing a peak point and the corresponding rotor speed within a lower portion of the active control range and a nadir point and the corresponding rotor speed within an upper portion of the active control range,
   wherein the lower portion of the active control range comprises generator rotor speeds within the active control range lower than the generator synchronous speed and equal to and greater than the lower bound generator active control range rotor speed value; and
   wherein the upper portion of the active control range comprises generator rotor speeds within the active control range equal to or higher than the generator synchronous speed and equal to or less than the lower bound generator active control range rotor speed value.

32. The system of claim 31, wherein determining the synchronous speed avoidance characteristics further comprises the processor configured to generate instructions to:
   access acceptable active control range electrical torque-rotor speed operational characteristics based on the generator synchronous speed, the lower and upper bound generator rotor speed values and the generator rotor speeds; and
   store the acceptable active control range electrical torque-rotor speed operational characteristics in system memory.

33. The system of claim 32, wherein the processor is further configured to generate instructions to:
   access a current value of the generator rotor speed;
   determine if the current value of the generator rotor speed is within the active control range;
   if the current value of the rotor speed is outside the active control range, apply electrical torque to the generator, based on the determined current value of the generator rotor speed and nominal electrical torque-rotor speed operational characteristics, in order to maintain the current generator rotor speed; and
   if the current value of the generator rotor speed is within the active control range, apply electrical torque to the generator, based on the determined current value of the generator rotor speed and the determined electrical torque-rotor speed operational characteristics, in order to transition the generator rotor speed to a value outside the active control range.

34. The system of claim 33, wherein if the current value of the rotor speed is within the active control range and is lower than the generator synchronous speed, the processor is further configured to generate instructions to apply electrical torque to the generator which is higher than the aerodynamic torque of the rotor resulting in rotor deceleration to a rotor speed that is lower than the lower bound generator rotor speed value for the active control range.

35. The system of claim 34, wherein if the current value of the generator rotor speed is within the active control range and is higher than the generator synchronous speed, the processor is further configured to generate instructions to apply electrical torque to the generator which is lower than the aerodynamic torque of the rotor resulting in generator rotor acceleration to a generator rotor speed that is higher than the upper bound generator rotor speed value for the active control range.

36. The system of claim 35, wherein the active control range further comprises of an operating range centered around the generator synchronous speed and between the peak and nadir points wherein the electrical torque decreases linearly with increasing rotor speed.

37. The system of claim 33, wherein applying electrical torque to the generator comprises the processor configured to generate instructions to control the level of an active current applied to the rotor of the generator.

38. The system of claim 31, wherein determining the synchronous speed avoidance characteristics further comprises the processor configured to generate instructions to:
   access acceptable active control range power regulation characteristics based on the generator synchronous speed, the lower and upper bound generator rotor speed values of the determined active control range, and the generator rotor speeds; and
   store the acceptable active control range power regulation characteristics in system memory.

39. The system of claim 38, wherein the processor is further configured to generate instructions to:
   access a current value of the generator rotor speed;
   determine if the current value of the generator rotor speed is within the active control range;
   if the current value of the rotor speed is outside the active control range, apply electrical power to the generator, based on the determined current value of the generator rotor speed and the power regulation characteristics, in order to maintain the current generator rotor speed; and
   if the current value of the generator rotor speed is within the active control range, apply electrical power to the generator, based on the determined current value of the generator rotor speed and the determined power regulation characteristics, in order to transition the generator rotor speed to a value outside the active control range.

40. The system of claim 39, wherein if the current value of the generator rotor speed is within the active control range and is lower than the generator synchronous speed, the processor is further configured to generate instructions to apply electrical power to the generator that is higher than the aerodynamic power of the rotor resulting in rotor deceleration to a rotor speed that is lower than the lower bound generator rotor speed value for the active control range.

41. The system of claim 40, wherein if the current value of the generator rotor speed is within the active control range and is higher than the generator synchronous speed, the processor is further configured to generate instructions to apply electrical power to the generator which is lower than the aerodynamic power of the rotor resulting in generator rotor acceleration to a generator rotor speed that is higher than the upper bound generator rotor speed value for the active control range.

42. The system of claim 41, wherein the active control range further comprises of an operating range centered around the generator synchronous speed and between the peak and nadir points wherein the power regulation characteristics decreases linearly with increasing rotor speed.

43. The system of claim 39, wherein applying electrical power to the generator comprises the processor configured to generate instructions to control the level of an active current applied to the rotor of the generator.

44. A system configured to control a variable speed wind turbine generator, comprising:
   a processor;
   a memory in communication with the processor, the memory for storing a plurality of processing instructions directing the processor to:
      access a determined generator rotor speed active control range and synchronous speed avoidance characteristics determined from operational junction temperature characteristics of power semiconductors used within a generator's power converter, reliability characteristics of the power semiconductors, current ratings of the power semiconductors and a generator synchronous speed value;

compare a current value of the generator rotor speed associated with a doubly-fed induction generator with the accessed determined rotor speed active control range and synchronous speed avoidance characteristics; and control a generator rotor speed associated with a doubly-fed induction generator based on the determined active control range and synchronous speed avoidance characteristics.

45. The system of claim 44, wherein determining the generator rotor speed active control range and synchronous speed avoidance characteristics further comprises of the processor configured to generate instructions to:

derive an active control trigger rotor frequency based on generator slip characteristics, acceptable semiconductor junction temperature variation and operational semiconductor junction temperature characteristics, wherein the active control range upper and lower bound generator rotor speed values are determined based on the derived active control trigger rotor frequency.

46. The system of claim 45, wherein the processor is further configured to generate instructions to:

access a current value of the generator rotor speed;

determine if the current value of the generator rotor speed is within the active control range;

if the current value of the generator rotor speed is outside the active control range, apply a generator rotor active current value to the generator rotor based on the determined current value of the generator rotor speed to maintain the current generator rotor speed; and if the current value of the generator rotor speed is within the active control range, apply the generator rotor active current value to the generator rotor based on the determined current value of the generator rotor speed to transition the generator rotor speed to a value outside the active control range.

47. The system of claim 46, wherein if the current value of the generator rotor speed is within the active control range and is lower than the generator synchronous speed, the processor is further configured to generate instructions to apply the generator rotor active current value that is derived based on an acceptable electrical torque to the generator which is higher than the aerodynamic torque of the rotor resulting in rotor deceleration to a generator rotor speed that is lower than the lower bound generator rotor speed value for the determined active control range.

48. The system of claim 47, wherein if the current value of the generator rotor speed is within the active control range and is higher than the generator synchronous speed, the processor is further configured to generate instructions to apply the generator rotor active current value that is derived based on an acceptable electrical torque to the generator which is lower than the aerodynamic torque of the rotor resulting in rotor acceleration to a generator rotor speed that is higher than the upper bound generator rotor speed value for the determined active control range.

49. The system of claim 46, wherein if the current value of the generator rotor speed is within the active control range and is lower than the generator synchronous speed, the processor is further configured to generate instructions to apply the generator rotor active current value derived based on an acceptable power regulation characteristic wherein the electrical power applied to the generator is higher than the aerodynamic power of the rotor resulting in rotor deceleration to a generator rotor speed that is lower than the lower bound generator rotor speed value for the determined active control range.

50. The method of claim 47, wherein if the current value of the generator rotor speed is within the active control range and is higher than the generator synchronous speed, the processor is further configured to generate instructions to apply the generator rotor active current value derived based on an acceptable power regulation characteristic wherein the electrical power applied to the generator is lower than the aerodynamic power of the rotor resulting in rotor acceleration to a rotor speed that is higher than the upper bound generator rotor speed value for the determined active control range.

* * * * *

UNITED STATES PATENT AND TRADEMARK OFFICE
CERTIFICATE OF CORRECTION

| | | |
|---|---|---|
| PATENT NO. | : 8,035,240 B2 | Page 1 of 1 |
| APPLICATION NO. | : 12/129543 | |
| DATED | : October 11, 2011 | |
| INVENTOR(S) | : Erdman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 693 days.

Signed and Sealed this
Thirteenth Day of March, 2012

David J. Kappos
*Director of the United States Patent and Trademark Office*